United States Patent
Naoi et al.

(10) Patent No.: US 11,348,711 B2
(45) Date of Patent: May 31, 2022

(54) CORE-SHELL PARTICLE, FIRED PRODUCT OF CORE-SHELL PARTICLE, MANUFACTURING METHOD OF CORE-SHELL PARTICLE, EPSILON TYPE IRON OXIDE-BASED COMPOUND PARTICLE, MANUFACTURING METHOD OF EPSILON TYPE IRON OXIDE-BASED COMPOUND PARTICLE, MAGNETIC RECORDING MEDIUM, AND MANUFACTURING METHOD OF MAGNETIC RECORDING MEDIUM

(71) Applicant: FUJIFILM Corporation, Tokyo (JP)

(72) Inventors: Kenji Naoi, Kanagawa (JP); Masashi Shirata, Kanagawa (JP); Takashi Fujimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 391 days.

(21) Appl. No.: 16/132,662

(22) Filed: Sep. 17, 2018

(65) Prior Publication Data
US 2019/0096551 A1    Mar. 28, 2019

(30) Foreign Application Priority Data

Sep. 27, 2017 (JP) ............... JP2017-187171

(51) Int. Cl.
| | |
|---|---|
| *H01F 1/11* | (2006.01) |
| *C01G 49/06* | (2006.01) |
| *C01G 49/08* | (2006.01) |
| *C01G 49/00* | (2006.01) |
| *C01G 49/02* | (2006.01) |
| *G11B 5/712* | (2006.01) |
| *G11B 5/706* | (2006.01) |

(52) U.S. Cl.
CPC ........... *H01F 1/11* (2013.01); *C01G 49/0018* (2013.01); *C01G 49/02* (2013.01); *C01G 49/06* (2013.01); *C01G 49/08* (2013.01); *G11B 5/712* (2013.01); *C01P 2002/32* (2013.01); *C01P 2004/04* (2013.01); *C01P 2004/64* (2013.01); *C01P 2004/84* (2013.01); *C01P 2006/42* (2013.01); *G11B 5/70642* (2013.01)

(58) Field of Classification Search
CPC ......... H01F 1/11; H01F 1/112; C01P 2004/84
See application file for complete search history.

(56) References Cited

U.S. PATENT DOCUMENTS

| | | | | | |
|---|---|---|---|---|---|
| 7,708,902 | B2 * | 5/2010 | Ohkoshi | ................ | G11B 5/714 252/62.58 |
| 7,781,082 | B2 * | 8/2010 | Ohkoshi | ................ | C01G 49/06 428/836.2 |
| 8,072,365 | B2 * | 12/2011 | Ohkoshi | ............ | C01G 49/0045 342/1 |
| 8,097,180 | B2 * | 1/2012 | Ohkoshi | ................ | C04B 35/26 252/62.57 |
| 8,444,872 | B2 * | 5/2013 | Ohkoshi | ........... | C04B 35/62807 252/62.56 |
| 2016/0104560 | A1 * | 4/2016 | Ohkoshi | ............... | H01F 1/0054 252/62.59 |
| 2018/0170767 | A1 | 6/2018 | Ohkoshi et al. | | |

FOREIGN PATENT DOCUMENTS

| | | | |
|---|---|---|---|
| CN | 105575578 | * | 5/2016 |
| JP | 53-90151 | * | 8/1978 |
| JP | 3-253004 A | | 11/1991 |
| JP | 2008-174405 | * | 7/2008 |
| JP | 2008-174405 A | | 7/2008 |
| JP | 5347146 B2 | | 11/2013 |
| JP | 2014-210680 A | | 11/2014 |
| JP | 2014-224027 A | | 12/2014 |
| JP | 2015-153918 A | | 8/2015 |
| JP | 2017-1944 A | | 1/2017 |

OTHER PUBLICATIONS

Translation for JP 53-90151, Aug. 8, 1978.*
Translation for CN 105575578, May 11, 2016.*
Notice of Reasons for Refusal dated Jun. 2, 2020, from the Japanese Patent Office in Application No. 2017-187171.
Office Action dated Jan. 5, 2021, from the Japanese Patent Office in Japanese Application No. 2017-187171.

* cited by examiner

*Primary Examiner* — C Melissa Koslow
(74) *Attorney, Agent, or Firm* — Sughrue Mion, PLLC

(57) ABSTRACT

The invention provides a core-shell particle which can provide, by being calcinated, epsilon type iron oxide-based compound particles that have a small coefficient of variation of primary particle diameter and show excellent SNR and running durability when employed in a magnetic recording medium as well as applications thereof. The core-shell particle includes: a core including at least one iron oxide selected from $Fe_2O_3$ or $Fe_3O_4$, or iron oxyhydroxide; and a shell that coats the core, the shell including a polycondensate of a metal alkoxide and a metal element other than iron, as well as applications thereof.

17 Claims, 1 Drawing Sheet

CORE-SHELL PARTICLE, FIRED PRODUCT OF CORE-SHELL PARTICLE, MANUFACTURING METHOD OF CORE-SHELL PARTICLE, EPSILON TYPE IRON OXIDE-BASED COMPOUND PARTICLE, MANUFACTURING METHOD OF EPSILON TYPE IRON OXIDE-BASED COMPOUND PARTICLE, MAGNETIC RECORDING MEDIUM, AND MANUFACTURING METHOD OF MAGNETIC RECORDING MEDIUM

CROSS-REFERENCE TO RELATED APPLICATIONS

This application claims priority from Japanese Patent Application No. 2017-187171, filed Sep. 27, 2017, the disclosure of which is incorporated herein by reference in its entirety.

BACKGROUND OF THE INVENTION

1. Field of the Invention

The present invention relates to a core-shell particle, a calcinated product of a core-shell particle, a manufacturing method of a core-shell particle, an epsilon type iron oxide-based compound particle, a manufacturing method of an epsilon type iron oxide-based compound particle, a magnetic recording medium, and a manufacturing method of a magnetic recording medium.

2. Description of the Related Art

Epsilon type iron oxide ($\varepsilon$-$Fe_2O_3$) is drawing an attention as an excellent magnetic material due to coercivity which is three times the coercivity of a ferrite magnet.

As a method of synthesizing epsilon type iron oxide, a method of calcinating FeCo alloy powder included in a matrix formed of $SiO_2$ has been known (for example, see JP2015-153918A).

In addition, a method of synthesizing epsilon type iron oxide by a reverse micelle method performed by using a raw material micelle including iron (III) nitrate nonahydrate and a neutralizer micelle including ammonia water has been known (for example, see JP5347146B).

Further, a method of synthesizing single-phase epsilon type iron oxide from sol of iron (III) oxide hydroxide nano fine particles ($\beta$-FeO(OH)) having an average particle diameter of approximately 6 nm has been known (for example, see JP2014-224027A).

SUMMARY OF THE INVENTION

In a case of using epsilon type iron oxide as a magnetic material, characteristics such as a small primary particle diameter of epsilon type iron oxide particles and a small coefficient of variation of the primary particle diameter (that is, a small variation in primary particle diameter) are important, from viewpoints of magnetic recording density and a signal-to-noise ratio (SNR) of a magnetic recording medium, for example.

However, according to the synthesis methods of epsilon type iron oxide of the related art, calcinating is performed in a state where the unsettled number of epsilon type iron oxide precursors are included in silica present in a matrix shape. Thus, the calcinated epsilon type iron oxide is aggregated, and a primary particle diameter of the epsilon type iron oxide particles and a coefficient of variation of the particle diameter tend to increase. In a case where the primary particle diameter of the epsilon type iron oxide particles and the coefficient of variation of the particle diameter are great, an SNR and running durability of a magnetic recording medium (for example, a magnetic tape) using the epsilon type iron oxide particles are deteriorated.

In addition, even in a case where an average primary particle diameter of the epsilon type iron oxide particles of the related art is comparatively small (for example, equal to or smaller than 15 nm), it cannot be said that a coefficient of variation of the primary particle diameter is sufficiently small, and thus, in a case of using the epsilon type iron oxide particles in a magnetic recording medium (for example, a magnetic tape), an SNR and running durability are deteriorated.

In these circumstances, an object of one embodiment of the invention is to provide core-shell particles which can provide, by being calcinated, epsilon type iron oxide-based compound particles having a small coefficient of variation of primary particle diameter and showing excellent SNR and running durability when employed in a magnetic recording medium.

Another object of the embodiment of the invention is to provide a method of manufacturing core-shell particles capable of being obtained from epsilon type iron oxide-based compound particles having a small coefficient of variation of primary particle diameter and showing excellent SNR and running durability when employed in a magnetic recording medium is obtained.

Still another object of the embodiment of the invention is to provide calcinated products of core-shell particles, including epsilon type iron oxide-based compound particles having a small coefficient of variation of primary particle diameter and showing excellent SNR and running durability when employed in a magnetic recording medium.

Still another object of the embodiment of the invention is to provide epsilon type iron oxide-based compound particles having a small coefficient of variation of primary particle diameter and showing excellent SNR and running durability when employed in a magnetic recording medium.

Still another object of the embodiment of the invention is to provide a manufacturing method of epsilon type iron oxide-based compound particles having a small coefficient of variation of primary particle diameter and showing excellent SNR and running durability when employed in a magnetic recording medium.

Still another object of the embodiment of the invention is to provide a magnetic recording medium which includes epsilon type iron oxide-based compound particles having a small coefficient of variation of primary particle diameter, and shows excellent SNR and running durability.

Still another object of the embodiment of the invention is to provide a manufacturing method of a magnetic recording medium which includes epsilon type iron oxide-based compound particles having a small coefficient of variation of primary particle diameter, and shows excellent SNR and running durability.

Specific means for achieving the aforementioned objects include the following aspects.

<1> A core-shell particle comprising:

a core including at least one iron oxide selected from the group consisting of $Fe_2O_3$ and $Fe_3O_4$, or iron oxyhydroxide; and a shell that coats the core, the shell including a polycondensate of a metal alkoxide and including a metal element other than iron.

<2> The core-shell particle according to <1>, wherein one core-shell particle comprises one core.

<3> The core-shell particle according to <1> or <2>, wherein the metal element is at least one metal element selected from the group consisting of Ga, Al, In, Nb, Co, Zn, Ni, Mn, Ti and Sn.

<4> The core-shell particle according to any one of <1> to <3>, wherein the at least one iron oxide selected from the group consisting of $Fe_2O_3$ and $Fe_3O_4$ comprises a spinel type structure.

<5> The core-shell particle according to any one of <1> to <3>, wherein the iron oxyhydroxide comprises β-iron oxyhydroxide.

<6> The core-shell particle according to any one of <1> to <5>, wherein the metal alkoxide comprises silicon.

<7> The core-shell particle according to <6>, wherein an element mass ratio of iron with respect to silicon is from 1/2 to 1/15.

<8>

A method of manufacturing a core-shell particle, the method comprising:

emulsifying, in an organic solvent including a surfactant, a core component including at least one iron oxide selected from the group consisting of $Fe_2O_3$ and $Fe_3O_4$, or iron oxyhydroxide; and coating the core formed by the emulsifying with a shell comprising a polycondensate of a metal alkoxide and comprising a metal element other than iron.

<9> The method of manufacturing a core-shell particle according to <8>, wherein the surfactant comprises a non-ionic surfactant.

<10> The method of a manufacturing core-shell particle according to <8> or <9>, wherein one core-shell particle is formed with respect to one core.

<11> The method of manufacturing a core-shell particle according to any one of <8> to <10>, wherein the metal element is at least one kind of metal element selected from the group consisting of Ga, Al, In, Nb, Co, Zn, Ni, Mn, Ti and Sn.

<12> The method of manufacturing a core-shell particle according to <8> to <11>, wherein the at least one iron oxide selected from the group consisting of $Fe_2O_3$ and $Fe_3O_4$ comprises a spinel type structure.

<13> The method of manufacturing a core-shell particle according to any one of <8> to <11>, wherein the iron oxyhydroxide comprises β-iron oxyhydroxide.

<14> The method of manufacturing a core-shell particle according to any one of <8> to <13>, wherein the metal alkoxide comprises silicon.

<15> The method of manufacturing a core-shell particle according to <14>, wherein an element mass ratio of iron with respect to silicon in the core-shell particle is from 1/2 to 1/15.

<16> A method of manufacturing an epsilon type iron oxide-based compound particle, the method comprising: forming the core-shell particle according to any one of <1> to <7>; calcinating the core-shell particle; and removing a shell of the core-shell particle.

<17> A method of manufacturing an epsilon type iron oxide-based compound particle, the method comprising: forming a core-shell particle according to the method of manufacturing a core-shell particle according to any one of <8> to <15>; calcinating the core-shell particle; and removing a shell of the core-shell particle.

<18> A method of manufacturing a magnetic recording medium, the method comprising: forming an epsilon type iron oxide-based compound particle according to the method of <16>; preparing a composition for forming a magnetic layer, the composition comprising the epsilon type iron oxide-based compound particle; applying the composition for forming a magnetic layer onto a non-magnetic support; and drying the composition for forming a magnetic layer on the non-magnetic support to form a magnetic layer.

<19> A method of manufacturing a magnetic recording medium, the method comprising:

forming an epsilon type iron oxide-based compound particle according to the method of <17>; preparing a composition for forming a magnetic layer, the composition comprising the epsilon type iron oxide-based compound particle; applying the composition for forming a magnetic layer onto a non-magnetic support; and drying the composition for forming a magnetic layer on the non-magnetic support to form a magnetic layer.

<20> An epsilon type iron oxide-based compound particle, in which an average primary particle diameter is 6.0 nm to 20 nm, and a coefficient of variation of primary particle diameter is smaller than 0.4.

<21> The epsilon type iron oxide-based compound particle according to <18>, which is a core of a calcinated product of the core-shell particle according to any one of <1> to <7>.

<22> A magnetic recording medium comprising: the epsilon type iron oxide-based compound particle according to <18> or <19>.

<23> A method of manufacturing a magnetic recording medium, the method comprising: preparing a magnetic layer forming composition including the epsilon type iron oxide-based compound particle according to <18> or <19>; applying the magnetic layer forming composition onto a non-magnetic support; and drying the magnetic layer forming composition on the non-magnetic support to form a magnetic layer.

<24> A calcinated product of the core-shell particle according to any one of <1> to <7>.

According to this disclosure, it is possible to provide a core-shell particle which can provide, by being calcinated, epsilon type iron oxide-based compound particles having a small coefficient of variation of primary particle diameter and showing excellent SNR and running durability when employed in a magnetic recording medium.

According to this disclosure, it is possible to provide a method of manufacturing core-shell particles which can provide, by being calcinated, epsilon type iron oxide-based compound particles having a small coefficient of variation of primary particle diameter and showing excellent SNR and running durability when employed in a magnetic recording medium.

According to this disclosure, it is possible to provide a calcinated product of the core-shell particle including epsilon type iron oxide-based compound particles having a small coefficient of variation of primary particle diameter and showing excellent SNR and running durability when employed in a magnetic recording medium.

According to this disclosure, it is possible to provide epsilon type iron oxide-based compound particles having a small coefficient of variation of primary particle diameter and showing excellent SNR and running durability when employed in a magnetic recording medium.

According to this disclosure, it is possible to provide a method of manufacturing epsilon type iron oxide-based compound particles having a small coefficient of variation of primary particle diameter and showing excellent SNR and running durability when employed in a magnetic recording medium.

According to this disclosure, it is possible to provide a magnetic recording medium which includes epsilon type iron oxide-based compound particles having a small coefficient of variation of primary particle diameter, and shows excellent SNR and running durability.

According to this disclosure, it is possible to provide a method of manufacturing a magnetic recording medium which includes epsilon type iron oxide-based compound particles having a small coefficient of variation of primary particle diameter, and shows excellent SNR and running durability.

DESCRIPTION OF THE PREFERRED EMBODIMENTS

Figure 1:
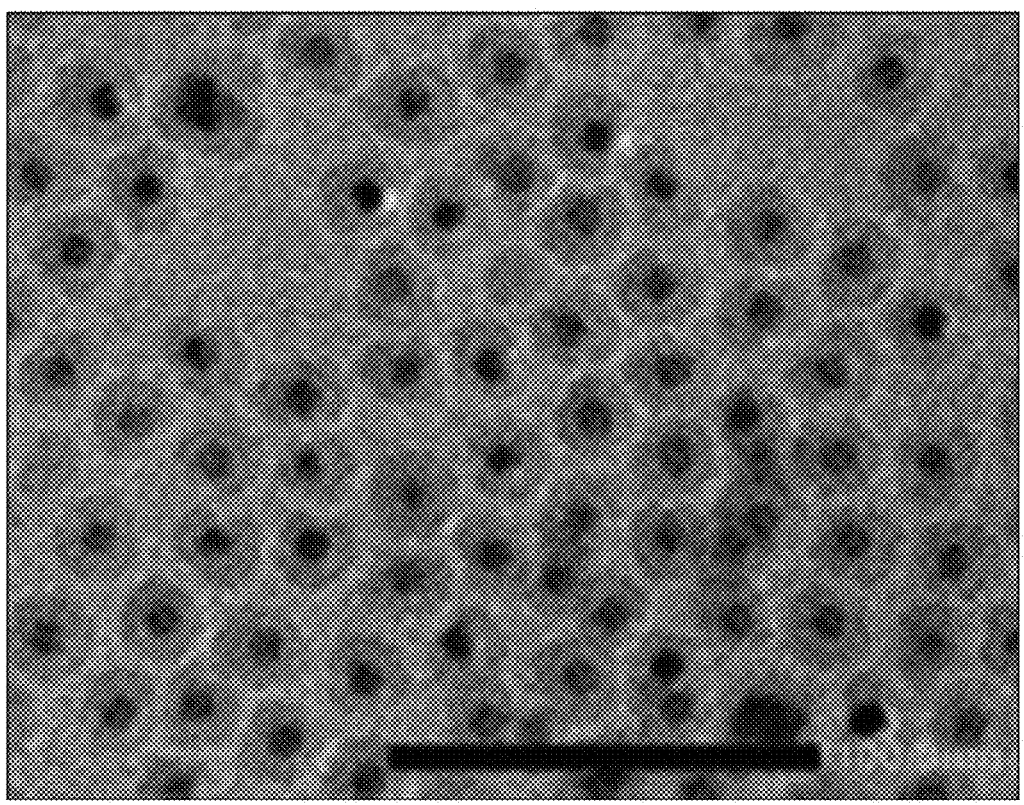
FIG. 1 is an image showing a result obtained by observing core-shell particles of Example 2 with a transmission electron microscope (TEM).

In this disclosure, a numerical value range shown with "to" means a range including numerical values written before and after "to", respectively as the minimum value and the maximum value. In the numerical value range disclosed in a stepwise manner in this disclosure, an upper limit value or a lower limit value disclosed in a certain numerical value range may be replaced with an upper limit value or a lower limit value of another numerical value range disclosed in a stepwise manner. In addition, in the numerical value range disclosed in this disclosure, an upper limit value or a lower limit value disclosed in a certain numerical value range may be replaced with values shown in examples.

In this disclosure, in a case where a plurality of substances corresponding to components are present in a composition, the amount of each component in the composition means a content of the plurality of substances present in the composition, unless otherwise noted.

In this disclosure, a term "step" not only means an independent step, but also includes a step, as long as the intended object of the step is achieved, even in a case where the step cannot be clearly distinguished from another step.

A "solvent" in this disclosure is used as a meaning including water, an organic solvent, and a mixed solvent of water and an organic solvent.

Core-Shell Particles

Core-shell particles of this disclosure respectively include: a core including at least one iron oxide selected from $Fe_2O_3$ or $Fe_3O_4$, or iron oxyhydroxide; and a shell including a polycondensate of metal alkoxide and a metal element other than iron and coating the core.

In synthesis of epsilon type iron oxide-based compound particles, it is desired that the core including iron is coated with the shell such as silica, at the time of calcinating. However, in a synthesis method of the related art disclosed in JP2015-153918A and JP5347146B, an aspect of a shell coated on the core is not controlled, and aggregation of cores occurs due to calcinating performed in a state where the plurality of cores are scattered in the shell having a matrix shape. Accordingly, a particle diameter of the generated epsilon type iron oxide-based compound particles cannot be controlled. In addition, although JP2014-224027A discloses epsilon type iron oxide having a comparatively small average primary particle diameter small (for example, equal to or smaller than 15 nm), it cannot be said that a coefficient of variation of the primary particle diameter is sufficiently small.

With respect to this, in the core-shell particles of this disclosure, the core which is a calcinated precursor of epsilon type iron oxide-based compound particles is coated with the shell including a polycondensate of metal alkoxide, and thus, each core-shell particle is preferably present in an independent manner. Here, the core-shell particles which are "present in an independent manner" means that core-shell particles are not bonded to each other, that is, the shell is not shared between the plurality of core-shell particles. In a case where the core-shell particles are present in an independent manner, it is possible to prevent aggregation of the cores at the time of calcinating and generate epsilon type iron oxide-based compound particles having a small coefficient of variation of primary particle diameter.

In this disclosure, it is thought that the core-shell particles can be present in an independent manner mainly due to an increase in dispersibility of the core realized by emulsifying the core by using a surfactant before coating the core with the shell, and formation of the shell which is individually coated on the core in each reverse micelle by proceeding condensation polymerization of metal alkoxide in the reverse micelle including the core formed by emulsification, in a manufacturing method of the core-shell particles.

In addition, in the core-shell particles of this disclosure, a core including at least one iron oxide selected from $Fe_2O_3$ or $Fe_3O_4$, or iron oxyhydroxide is prepared before calcinating, then, a core-shell particle is calcinated, to diffuse a metal element other than iron from the shell to the core to substitute the metal element with iron metal, thereby forming an epsilon type iron oxide-based compound. It is thought that, by including no metal element except for iron in the core before calcinating, as described above, a coefficient of variation of primary particle diameter of the core decreases and excellent SNR and running durability are exhibited when made into a magnetic recording medium.

Further, since the core-shell particles of this disclosure are calcinated, metal atoms other than iron present in the shell are diffused to the core and substituted with iron atoms, and an epsilon type iron oxide-based compound including the metal atoms other than iron is formed. Accordingly, an epsilon type iron oxide-based compound stably including a desired amount of metal atoms other than iron can be generated, compared to a case of including the metal atoms other than iron in the core before calcinating, and it is possible to obtain an epsilon type iron oxide-based compound having more preferable properties.

A core-shell structure of the core-shell particle can be confirmed by observation performed with a transmission electron microscope (TEM).

It is preferable that one core-shell particle includes one core. In a case where one core-shell particle includes one core, it is possible to prevent aggregation of the cores at the time of calcinating and decrease a coefficient of variation of primary particle diameter (that is, decrease a variation in primary particle diameter) of the epsilon type iron oxide-based compound particles after calcinating.

Since the core-shell particles include a core including iron, the core-shell particles can be used as hard magnetic particles. In addition, since the core-shell particles include a core including iron, the core-shell particles can be used as a radio wave absorber. The core-shell particles which can be used as hard magnetic particles may be calcinated products obtained after calcinating of the core-shell particles of this disclosure. In a case where the core-shell particles are calcinated products obtained after calcinating, the core is the epsilon type iron oxide-based compound particle.

Since shell includes a polycondensate of metal alkoxide, the core-shell particles have a high degree of freedom regarding surface modification. Accordingly, by performing desired surface modification with respect to the shell, the core-shell particles of this disclosure can be suitably used for the purpose of a drug delivery system or hyperthermia treatment.

An average primary particle diameter of the core-shell particles is preferably 5 nm to 50 nm, more preferably 5 nm to 30 nm and most preferably 7 nm to 25 nm.

The primary particle diameters of the core-shell particles can be measured by using a TEM. As the TEM, a transmission electron microscope H-9000 manufactured by Hitachi, Ltd. can be used, for example.

The primary particle diameter of the core-shell particle can be calculated as a value obtained by imaging the powder including the core-shell particles at a magnification ratio of 50,000 to 80,000 with the TEM, printing the image on photographic printing paper so that the total magnification becomes 500,000 to obtain an image of the core-shell particles, selecting any core-shell particle from the obtained image, tracing an outline of the core-shell particle with a digitizer, and calculating a diameter (equivalent circle area diameter) of a circle having the same area as the traced region. In the image analysis performed in the calculation of the equivalent circle area diameter, well-known image analysis software, for example, image analysis software KS-400 manufactured by Carl Zeiss can be used. The primary particle diameter is a particle diameter of an independent core-shell particle which is not aggregated.

In addition, an arithmetical mean of the primary particle diameters of the plurality of core-shell particles (for example, 500 core-shell particles) is set as an "average primary particle diameter".

An average primary particle diameter of calcinated products of core-shell particles obtained by calcinating the core-shell particles is preferably 5 nm to 50 nm, more preferably 5 nm to 30 nm, and most preferably 7 nm to 25 nm. The average primary particle diameter of the calcinated products of the core-shell particles can be measured by the same procedure as that of the average primary particle diameter of the core-shell particles.

Core

The core-shell particle includes a core. The core is calcinated to form an epsilon type iron oxide-based compound particle which will be described later in detail.

The core includes at least one iron oxide selected from $Fe_2O_3$ or $Fe_3O_4$, or iron oxyhydroxide.

The core may include substances other than at least one iron oxide selected from $Fe_2O_3$ and $Fe_3O_4$ and substances other than iron oxyhydroxide, within a range not disturbing the formation of the epsilon type iron oxide-based compound particle by calcinating. The substances other than at least one iron oxide selected from $Fe_2O_3$ or $Fe_3O_4$ and substances other than iron oxyhydroxide are not particularly limited, and salt such as alkali metal salt, alkaline earth metal salt, or a transition metal element, or oxide such as a transition metal element may be mixed as impurities.

Iron Oxide

Iron oxide is at least one iron oxide selected from $Fe_2O_3$ or $Fe_3O_4$.

The iron oxide can be prepared by various well-known methods. The iron oxide can be preferably prepared by a method described in Example 2. In addition, examples of a commercially available iron oxide include product numbers 747327, 747424, 747254, 747343, 747408, 747416, 790508, 900084, 900026, 900028, 900027, 900063, 900043, 900042, 900062, 900064, 900081, 900082, 900037, 900038, 900083, 900088, 900089, 900090, 900091, 900092, 900093, 900093, 900094, 900148, 900201, 900199, 900200, 900041, 900034, 747335, 747432, 747459, 747467, and 747440 manufactured by Sigma-Aldrich Corporation.

The iron oxide may have any structure and preferably has a spinel type structure.

A predetermined structure, for example, the spinel type structure of the iron oxide can be confirmed by analyzing an X-ray diffraction (XRD) pattern. X'Pert PRO (manufactured by PANanalytical) can be used as an XRD device.

Iron Oxyhydroxide

Iron oxyhydroxide can also be represented by FeOOH.

The iron oxyhydroxide can be prepared by any method. For example, a metal raw material is dissolved in water, an alkali aqueous solution is added thereto and stirred, an acid aqueous solution is added and stirred, the generated precipitate is collected by centrifugal separation, the precipitate is washed with water and dried, and accordingly, the iron oxyhydroxide can be prepared as powder of iron oxyhydroxide. In addition, preferable iron oxyhydroxide can also be obtained by a method disclosed in paragraphs 0008 to 0024 of JP2011-51836A. The iron oxyhydroxide can be preferably prepared by a method described in Example 1.

The iron oxyhydroxide may have any structure, can have, for example, an α-iron oxyhydroxide structure, a β-iron oxyhydroxide structure, and/or a γ-iron oxyhydroxide structure, and preferably has a β-iron oxyhydroxide structure.

A predetermined structure, for example, the β-iron oxyhydroxide structure of the iron oxyhydroxide can be confirmed by analyzing an X-ray diffraction (XRD) pattern. X'Pert PRO (manufactured by PANanalytical) can be used as an XRD device.

An average primary particle diameter of the core before calcinating can be measured by the same procedure as that of the average primary particle diameter of the core-shell particles regarding the core part of the core-shell particle. The average primary particle diameter of the core is preferably 2 nm to 40 nm, more preferably 3 nm to 30 nm, even more preferably 5 nm to 25 nm, and most preferably 5 nm to 10 nm.

The average primary particle diameter of the core before calcinating can be obtained by the same procedure as that of the "average primary particle diameter of the core-shell particles" described above.

Shell

The core-shell particle includes a shell coating the core. The shell includes a polycondensate of metal alkoxide and a metal element other than iron.

The "metal element other than iron" included in the shell is different from the metal element included in metal alkoxide.

The shell may include substances other than the polycondensate of metal alkoxide and substances other than the metal element other than iron, within a range not disturbing the formation of the core-shell particle. The substances other than the polycondensate of metal alkoxide and substances other than the metal element other than iron are not particularly limited, and examples thereof include salt such as alkali metal salt, alkaline earth metal salt, or a transition metal element, or oxide such as a transition metal element, or a solvent used in a case of forming a shell.

Polycondensate of Metal Alkoxide

The shell preferably includes a polycondensate of metal alkoxide. The polycondensate of metal alkoxide is obtained by polycondensation of metal alkoxide.

Metal alkoxide is not particularly limited, as long as it includes an alkoxy group directly bonded to a metal atom and is a compound capable of being subjected to condensation polymerization. The metal alkoxide is preferably a compound including a group in which two or more alkoxy groups are directly bonded to a metal atom.

The polycondensate of metal alkoxide may be formed from one kind of metal alkoxide or may be formed from two or more kinds of metal alkoxide.

The metal element included in the metal alkoxide is different from the "metal element other than iron" included in the shell.

The metal atom of metal alkoxide includes an atom of an element classified as a metal, an atom of an element classified as a semimetal (for example, silicon or boron), and an atom showing metallic properties in a case of being bonded to an alkoxy group, although it is an atom of an element classified as a non-metal (for example, phosphorus). Examples of the metal atom include silicon (Si), titanium (Ti), zirconium (Zr), aluminum (Al), boron (B), phosphorus (P), zinc (Zn), magnesium (Mg), germanium (Ge), gallium (Ga), antimony (Sb), tin (Sn), tantalum (Ta), and vanadium (V).

The metal alkoxide is preferably metal alkoxide including silicon.

Examples of a metal alkoxide compound including silicon include tetramethoxy silane, tetraethoxy silane (TEOS), tetrapropoxy silane, trimethoxy silane, triethoxysilane, tripropoxy silane, methyltrimethoxy silane, methyltrimethoxy silane, methyltriethoxy silane, ethyltrimethoxy silane, ethyltriethoxy silane, propyltrimethoxy silane, propyltriethoxy silane, dimethyldimethoxy silane, dimethyldiethoxy silane, diethyldimethoxy silane, diethyldiethoxy silane, γ-chloropropyltrimethoxy silane, γ-chloropropyltriethoxy silane, phenyltrimethoxy silane, phenyltriethoxy silane, diphenyldimethoxy silane, and diphenyldiethoxy silane, and tetraethoxy silane is preferable.

Examples of a metal alkoxide compound including titanium include tetramethoxy titanium, tetraethoxy titanium, tetrapropoxy titanium, tetraisopropoxy titanium, tetrabutoxy titanium, tetra-sec-butoxy titanium, and tetra-tert-butoxy titanium.

Examples of a metal alkoxide compound including zirconium include tetramethoxy zirconium, tetraethoxy zirconium, tetrapropoxy zirconium, tetraisopropoxy zirconium, tetrabutoxy zirconium, tetra-sec-butoxy zirconium, and tetra-tert-butoxy zirconium.

Examples of a metal alkoxide compound including aluminum include trimethoxy aluminum, triethoxy aluminum, tripropoxy aluminum, triisopropoxy aluminum, tributoxy aluminum, tri-sec-butoxy aluminum, and tri-tert-butoxy aluminum.

Examples of a metal alkoxide compound including boron include trimethoxy borane, triethoxy borane, tripropoxy borane, triisopropoxy borane, tributoxy borane, tri-sec-butoxy borane, and tri-tert-butoxy borane.

Examples of a metal alkoxide compound including phosphorus include Trimethoxy phosphine and triethoxy phosphine.

Examples of a metal alkoxide compound including zinc include dimethoxy zinc and diethoxy zinc.

Examples of a metal alkoxide compound including magnesium include dimethoxy magnesium and diethoxy magnesium.

Examples of a metal alkoxide compound including germanium include tetraethoxy germanium and tetra-n-propoxy germanium.

Examples of a metal alkoxide compound including gallium include triethoxy gallium and tri-n-butoxy gallium.

Examples of a metal alkoxide compound including antimony include triethoxy antimony and tri-n-butoxy antimony.

Examples of a metal alkoxide compound including tin include tetraethoxy tin and tetra-n-propoxy tin.

Examples of a metal alkoxide compound including tantalum include pentamethoxytantalum and pentaethoxytantalum.

In a case where metal alkoxide is metal alkoxide including silicon, an element mass ratio (Fe/Si ratio) of iron with respect to silicon in the core-shell particle is preferably 1/1 to 1/30 and more preferably 1/2 to 1/15. By setting the Fe/Si ratio in the core-shell particle to be equal to or greater than 1/1 and preferably to be equal to or greater than 1/2, it is possible to sufficiently prevent aggregation of cores obtained in a case of calcinating. In addition, by setting the Fe/Si ratio in the core-shell particle to be equal to or smaller than 1/30 and preferably to be equal to or smaller than 1/15, the shell is removed in an excellent manner in a case of removing the shell from the core-shell particle after the calcinating, thereby generating epsilon type iron oxide-based compound particles having lesser impurities.

The element mass ratio of iron with respect to silicon in the core-shell particle can be obtained by conversion performed based on an area ratio of an area of a core part and an area of a shell part of the core-shell particle confirmed by the TEM observation and molecular weights of silicon and iron. Preferably, for the area ratio of the area of the core part and the area of the shell part, an arithmetical mean value of the area ratios obtained from the plurality of core-shell particles is used.

A thickness of the shell can be measured by observing the shell part of the core-shell particle with a TEM. The thickness of the shell is preferably an arithmetical mean of the thicknesses obtained regarding the plurality of core-shell particles. The thickness of the shell is preferably 0.5 nm to 30 nm, more preferably 1 nm to 15 nm, and even more preferably 2 nm to 8 nm.

Metal Element Other than Iron

The shell includes a metal element other than iron. By including the metal element other than iron in the shell of the core-shell particle, the metal element other than iron is diffused to the core in a case of the calcinating and substituted with iron atom forming the core, and an epsilon type iron oxide-based compound is formed. By controlling the metal element other than iron, it is possible to preferable to control magnetic properties of the epsilon type iron oxide-based compound particles and physical properties of the surface of the particle (interaction with a dispersing agent or various binding agents in a magnetic layer forming composition, in a case of manufacturing a magnetic recording medium).

As the metal element other than iron, at least one kind of metal element selected from the group consisting of Ga, Al, In, Nb, Co, Zn, Ni, Mn, Ti, and Sn is preferably used.

The metal element other than iron is different from the metal element included in metal alkoxide.

In the shell, the metal element other than iron may have an ionized aspect or may have an un-ionized aspect.

In a case where the metal element other than iron is set as $A^1$, an atomic composition ratio of the metal element other than iron ($A^1$) and iron (Fe) preferably satisfies a relationship expression of $A^1:Fe=a1:2-a1$ (here, $0<a1<2$). Here, a1 preferably satisfies $0<a1<1.8$ and more preferably satisfies $0.1<a1<1.2$, from viewpoints of magnetic properties and stable formation of an ε phase.

The metal element other than iron included in the shell can be confirmed by Transmission electron microscopy-Energy dispersive X-ray spectrometer (TEM-EDS) analysis using high-resolution transmission type microscope Talos manufactured by FEI.

In a case where at least one kind of a trivalent metal element other than iron selected from the group consisting of Ga, Al, In, and Nb is set as "$Z^1$", an atomic composition ratio of $Z^1$ and Fe preferably satisfies a relationship expression of $Z^1:Fe=z1:2-z1$ (here, $0<z1<2$). Here, z1 preferably satisfies $0<z1<1.8$ and more preferably satisfies $0.1<z1<1.2$, from viewpoints of magnetic properties and stable formation of an ε phase.

In a case where at least one kind of divalent metal element other than iron selected from the group consisting of Co, Ni, Mn, and Zn is set as "$X^1$" and at least one kind of tetravalent metal element other than iron selected from Ti or Sn is set as "$Y^1$", an atomic composition ratio of $X^1$, $Y^1$, and Fe preferably satisfies a relationship expression of $X^1:Y^1:Fe=x1:y1:2-x1-y1$ (here, $0<x1<1$ and $0<y1<1$). Here, x1 preferably satisfies $0<x1<0.5$, from viewpoints of magnetic properties and stable formation of an ε phase, and y1 preferably satisfies $0<y1<0.5$, from viewpoints of magnetic properties and stable formation of an ε phase.

In a case where at least one kind of divalent metal element other than iron selected from the group consisting of Co, Ni, Mn, and Zn is set as "$X^1$" and at least one kind of trivalent metal element other than iron selected from the group consisting of Ga, Al, In, and Nb is set as "$Z^1$", an atomic composition ratio of $X^1$, $Z^1$, and Fe preferably satisfies a relationship expression of $X^1:Z^1:Fe=x1:z1:2-x1-z1$ (here, $0<x1<1$ and $0<z1<1$). Here, x1 preferably satisfies $0<x1<0.5$, from viewpoints of magnetic properties and stable formation of an ε phase, and y1 preferably satisfies $0<y1<1$, from viewpoints of magnetic properties and stable formation of an ε phase.

In a case where at least one kind of tetravalent metal element other than iron selected from Ti or Sn is set as "$Y^1$" and at least one kind of trivalent metal element other than iron selected from the group consisting of Ga, Al, In, and Nb is set as "$Z^1$", an atomic composition ratio of $Y^1$, $Z^1$, and Fe preferably satisfies a relationship expression of $Y^1:Z^1:Fe=y1:z1:2-y1-z1$ (here, $0<y1<1$ and $0<z1<1$). Here, y1 preferably satisfies $0<y1<0.5$, from viewpoints of magnetic properties and stable formation of an ε phase, and z1 preferably satisfies $0<z1<1.2$, from viewpoints of magnetic properties and stable formation of an ε phase.

In a case where at least one kind of divalent metal element other than iron selected from the group consisting of Co, Ni, Mn, and Zn is set as "$X^1$", at least one kind of tetravalent metal element other than iron selected from Ti or Sn is set as "$Y^1$", and at least one kind of trivalent metal element other than iron selected from the group consisting of Ga, Al, In, and Nb is set as "$Z^1$", an atomic composition ratio of $X^1$, $Y^1$, $Z^1$, and Fe preferably satisfies a relationship expression of $X^1:Y^1:Z^1:Fe=x1:y1:z1:2-x1-y1-z1$ (here, $0<y1<1$ and $0<z1<1$). Here, from viewpoints of magnetic properties and stable formation of an ε phase, x1 preferably satisfies $0<x1<1.5$ and more preferably satisfies $0<x1<1.0$, y1 preferably satisfies $0<y1<0.5$ and more preferably satisfies $0<y1<0.3$, and z1 preferably satisfies $0<z1<0.5$ and more preferably satisfies $0<z1<0.3$.

Manufacturing Method of Core-Shell Particles

A manufacturing method of core-shell particles of this disclosure includes a step of emulsifying a core component including at least one iron oxide selected from $Fe_2O_3$ or $Fe_3O_4$, or iron oxyhydroxide in an organic solvent including a surfactant (step A); and a step of coating the core formed by the emulsifying with a shell including a polycondensate of metal alkoxide and a metal element other than iron (step B).

Regarding the core-shell particles obtained based on the manufacturing method described above, preferably one core-shell particle is formed with respect to one core.

Step A

The manufacturing method of core-shell particles includes the step of emulsifying a core component including at least one iron oxide selected from $Fe_2O_3$ or $Fe_3O_4$, or iron oxyhydroxide in an organic solvent including a surfactant (step A). By performing the step A, the core is formed.

By performing the step A, a reverse micelle including the core component of this disclosure is formed in the organic solvent, metal alkoxide which is a constituent of a shell to be added in the subsequent step flows into the reverse micelle and is subjected to condensation polymerization, thereby preferably forming core-shell particles which are present in an independent manner, that is, core-shell particles in which a shell is not shared between a plurality of core-shell particles.

The step A preferably includes a step of mixing an organic solvent and a surfactant, a step of mixing the organic solvent including the surfactant and acid or an alkali aqueous solution, and a step of mixing the organic solvent including the surfactant and acid or the alkali aqueous solution and a core.

Step of Mixing Organic Solvent and Surfactant

The step A preferably includes a step of mixing an organic solvent and a surfactant. The step of mixing an organic solvent and a surfactant is preferably performed by adding a surfactant into an organic solvent which has been vigorously stirred.

Organic Solvent

As the organic solvent, a well-known organic solvent can be used. The organic solvent is preferably a saturated or unsaturated hydrocarbon-based organic solvent having 5 to 18 carbon atoms, which may be linear, branched, or cyclic, more preferably pentane, hexane, or octane which may be linear, branched, or cyclic, and even more preferably cyclohexane.

Any amount of the organic solvent may be used, as long as it is the amount sufficient for emulsifying the core component. The amount of the organic solvent used is preferably equal to or greater than 100 parts by mass with respect to 1 part by mass of the core component.

Surfactant

As the surfactant, a well-known surfactant can be used. The surfactant is preferably an amphipathic surfactant, more preferably a nonionic surfactant, and even more preferably a surfactant in which a hydrophilic polyoxyalkylene (PO) chain and a hydrophobic group are bonded to each other with an ether bond. As the surfactant, poly(oxyethylene) nonylphenyl ether can be used, for example. A molecular weight of the surfactant is preferably 100 to 1,000. The surfactant may be used alone or in combination of two or more kinds thereof.

As the surfactant, a commercially available product can be used. For example, as the commercially available product of the surfactant, TERGITOL (registered trademark) NP Series and TritonX Series manufactured by The Dow Chemical Company, IGEPAL (registered trademark) CO Series and IGEPAL (registered trademark) CA Series manufactured by Rhodia Inc., Synperonic (registered trademark) NP Series manufactured by Croda International plc, EMULGEN Series manufactured by Kao Corporation, and NAROACTY (registered trademark) Series, SANNONIC Series, EMULMIN Series, SEDORAN Series, IONET Series, NEWPOL Series, and PUREMEEL Series manufactured by Sanyo Chemical Industries, Ltd. are preferable, and IGEPAL (registered trademark) C0520 Series manufactured by Rhodia Inc. is particularly preferable.

The amount of the surfactant used is preferably 0.1 parts by mass to 15 parts by mass and more preferably 1 part by mass to 10 parts by mass with respect to 100 parts by mass of the organic solvent.

Step of Mixing Organic Solvent Including Surfactant and Alkali Aqueous Solution

The step A preferably includes a step of mixing the organic solvent including the surfactant and an alkali aqueous solution after the step of mixing the organic solvent and the surfactant.

The alkali aqueous solution is not particularly limited, as long as it is an aqueous solution having pH exceeding 7 and equal to or smaller than 14, and a KOH aqueous solution, a NaOH aqueous solution, a tetramethylammonium hydroxide (TMAH) aqueous solution, or an ammonia aqueous solution is preferable, and an ammonia aqueous solution having 2% by mass to 30% by mass is more preferable.

The amount of the alkali aqueous solution used is preferably 0.05 parts by mass to 10 parts by mass and more preferably 0.1 parts by mass to 5 parts by mass with respect to 100 parts by mass of the organic solvent including the surfactant.

Step of Mixing Organic Solvent Including Surfactant and Alkali Aqueous Solution and Core The step A preferably includes a step of mixing the organic solvent including the surfactant and the alkali aqueous solution and a core, after the step of mixing the organic solvent including the surfactant and the alkali aqueous solution. By performing this step, a reverse micelle in which the core is incorporated into the surfactant is formed in the organic solvent.

In a case of using powder of iron oxyhydroxide as the core component, a dispersing agent such as oleic acid is mixed with powder of iron oxyhydroxide, and the powder thereof is crushed, thereby preparing paste-like iron oxyhydroxide. As described above, by mixing the core component with the dispersing agent, dispersibility with respect to the organic solvent can be improved.

Core

The core is the same as the core described in the section of "core" described above and the preferable ranges thereof are also identical.

Step B

The manufacturing method of the core-shell particles includes a step of coating the core formed by the emulsifying with a shell including a polycondensate of metal alkoxide and a metal element other than iron (step B).

The step B is preferably performed by stirring and mixing the reverse micelle in which the core formed in the step A is incorporated, metal alkoxide which is a component of the shell, and the metal element other than iron, in the organic solvent. Accordingly, the metal alkoxide and the metal element other than iron are incorporated into the reverse micelle including the core, and the metal alkoxide is subjected to condensation polymerization therein, thereby coating the core with the shell.

In a case where the metal alkoxide is metal alkoxide including silicon, the element mass ratio (Fe/Si ratio) of iron with respect to silicon in the core-shell particles obtained after coating the core is preferably 1/1 to 1/30 and more preferably 1/2 to 1/15.

Polycondensate of Metal Alkoxide

The "polycondensate of metal alkoxide" is the same as the polycondensate of metal alkoxide described in the section of "Polycondensate of Metal Alkoxide" described above and the preferable ranges thereof are also identical.

Metal Element Other than Iron

The "metal element other than iron" is the same as the metal element other than iron described in the section of "Metal Element Other Than Iron" described above and the preferable ranges thereof are also identical.

Manufacturing Method of Epsilon Type Iron Oxide-Based Compound Particles

The manufacturing method of epsilon type iron oxide-based compound particles includes a step of forming core-shell particles, a step of calcinating the core-shell particles, and a step of removing shells from the core-shell particles.

Here, the "epsilon type iron oxide-based compound particles" are particles formed from an epsilon type iron oxide-based compound. The "epsilon type iron oxide-based compound" will be described later.

The core-shell particles are the core-shell particles described in the section of "core-shell particles" described above and the preferable ranges thereof are also identical. The core-shell particles are preferably core-shell particles manufactured by the manufacturing method of core-shell particles of this disclosure.

Step of Forming Core-Shell Particles

The manufacturing method of epsilon type iron oxide-based compound particles includes a step of forming core-shell particles.

The step of forming the core-shell particles may be any method, as long as the core-shell particles of this disclosure can be formed. The step of forming the core-shell particles of this disclosure is preferably the manufacturing method of core-shell particles of this disclosure.

Step of Calcinating Core-Shell Particles

The manufacturing method of epsilon type iron oxide-based compound particles includes a step of calcinating the core-shell particles. By calcinating the core-shell particles, the metal element other than iron included in the shell is diffused to the core and substituted with the iron atom, and an epsilon type iron oxide-based compound including metal atoms other than iron is formed.

In the core-shell particles of this disclosure, a core including at least one iron oxide selected from $Fe_2O_3$ or $Fe_3O_4$, or iron oxyhydroxide is prepared before calcinating, then, a core-shell particle is calcinated, to diffuse a metal element other than iron from the shell to the core to substitute the metal element with iron metal, thereby forming an epsilon type iron oxide-based compound. It is thought that, by including no metal element except for iron in the core before calcinating, as described above, a coefficient of variation of primary particle diameter of the core decreases and excellent SNR and running durability are exhibited when made into a magnetic recording medium.

The step of calcinating the core-shell particles can be performed under well-known conditions for calcinating epsilon type iron oxide. By performing the calcinating, the core becomes the epsilon type iron oxide-based compound particle. In the calcinating conditions, the calcinating is preferably performed in a well-known calcinating furnace in the atmosphere, a temperature thereof is preferably 950° C. to 1,300° C., more preferably 1,000° C. to 1,200° C., and most preferably 1,050° C. to 1,150° C., and a period of time thereof is preferably 1 hour to 20 hours, more preferably 2 hours to 15 hours, and most preferably 3 hours to 12 hours.

Step of Removing Shells from Core-Shell Particles

The manufacturing method of epsilon type iron oxide-based compound particles includes a step of removing shells from the core-shell particles.

In the core-shell particles after calcinating the core-shell particles, the cores become the epsilon type iron oxide-based compound particles, but the shells remain as it is. Accordingly, the shells are removed from the core-shell particles to isolate only the epsilon type iron oxide-based compound particles.

The removal of the shells can be performed by a well-known method capable of dissolving a polycondensate of metal alkoxide. The removal of the shells can be performed, for example, by putting the calcinated core-shell particles of this disclosure in sodium hydroxide having a concentration of 1 mol/L to 8 mol/L at a liquid temperature of 20° C. to 90° C., and stirring for 1 hour to 100 hours.

After removing the shells, a step of performing well-known washing can be provided in order to remove a residue from the epsilon type iron oxide-based compound particles.

A step of performing well-known drying can be suitably provided in order to dry the epsilon type iron oxide-based compound particles.

Epsilon Type Iron Oxide-Based Compound Particles

The "epsilon type iron oxide-based compound particles" are particles formed of the epsilon type iron oxide-based compound which will be described later.

Regarding the epsilon type iron oxide-based compound particles, an average primary particle diameter is preferably 6.0 nm to 20 nm, a coefficient of variation of primary particle diameter is preferably smaller than 0.4, the average primary particle diameter is more preferably 7.0 nm to 20 nm, the coefficient of variation of primary particle diameter is more preferably smaller than 0.4, the average primary particle diameter is even more preferably 10 nm to 15 nm, the coefficient of variation of primary particle diameter is even more preferably smaller than 0.4, and the average primary particle diameter is most preferably 10 nm to 12 nm, the coefficient of variation of primary particle diameter is most preferably smaller than 0.4. Since the epsilon type iron oxide-based compound particles have such average primary particle diameter and coefficient of variation of primary particle diameter, excellent SNR and running durability can be exhibited, in a case where the epsilon type iron oxide-based compound particles are used in a magnetic recording medium.

In addition, regarding the epsilon type iron oxide-based compound particles, the average primary particle diameter is preferably 6.0 nm to 20 nm, the coefficient of variation of primary particle diameter is preferably smaller than 0.3, the average primary particle diameter is more preferably 7.0 nm to 20 nm, the coefficient of variation of primary particle diameter is more preferably smaller than 0.3, the average primary particle diameter is even more preferably 10 nm to 15 nm, the coefficient of variation of primary particle diameter is even more preferably smaller than 0.3, and the average primary particle diameter is particularly preferably 10 nm to 12 nm, the coefficient of variation of primary particle diameter is particularly preferably smaller than 0.3. Since the epsilon type iron oxide-based compound particles have such average primary particle diameter and coefficient of variation of primary particle diameter, more excellent SNR and running durability can be exhibited, in a case where the epsilon type iron oxide-based compound particles are used in a magnetic recording medium.

The average primary particle diameter of the epsilon type iron oxide-based compound particles can be obtained by the same procedure as that of the "average primary particle diameter of the core-shell particles".

The epsilon type iron oxide-based compound particles having the average primary particle diameter and the coefficient of variation in primary particle diameter can be manufactured by any method. The epsilon type iron oxide-based compound particles having the average primary particle diameter and the coefficient of variation in primary particle diameter are preferably cores of calcinated products obtained by calcinating the core-shell particle of this disclosure.

The epsilon type iron oxide-based compound particles are preferably epsilon type iron oxide-based compound particles manufactured by the manufacturing method of the epsilon type iron oxide-based compound particles of this disclosure. In a case where of the epsilon type iron oxide-based compound particles manufactured by the manufacturing method of the epsilon type iron oxide-based compound particles of this disclosure, the epsilon type iron oxide-based compound particles can be both of epsilon type iron oxide-based compound particles as cores coated on the shells after calcinating the core-shell particles, and epsilon type iron oxide-based compound particles formed by removing the shells from the calcinated core-shell particles.

The primary particle diameter and the average primary particle diameter of the epsilon type iron oxide-based compound particles can be measured by the same procedure as the average primary particle diameter of the core-shell particles. In a case where the epsilon type iron oxide-based compound particles are cores of calcinated products of the core-shell particles, the primary particle diameter and the average primary particle diameter of the epsilon type iron oxide-based compound particles can be measured by performing the measurement regarding the core parts of the calcinated core-shell particles by using a TEM.

The coefficient of variation of the primary particle diameter the epsilon type iron oxide-based compound particles is calculated as a value obtained by dividing a standard deviation obtained regarding the primary particle diameters of the plurality of epsilon type iron oxide-based compound particles by the average primary particle diameter.

Regarding the primary particle diameters of the epsilon type iron oxide-based compound particles, the expression that "the coefficient of variation is small" means that a coefficient of variation obtained by dividing a standard deviation of primary particle diameters of the plurality of (for example, 500) core-shell particles of this disclosure by the average primary particle diameter is smaller than 0.5, preferably smaller than 0.4, and more preferably smaller than 0.3.

Epsilon Type Iron Oxide-Based Compound

The epsilon type iron oxide-based compound is at least one kind of the epsilon type iron oxide-based compound selected from the group consisting of $\varepsilon\text{-}Fe_2O_3$ and a compound represented by Formula (1).

$$\varepsilon\text{-}A^2{}_{a2}Fe_{2-a2}O_3 \quad (1)$$

In Formula (1), $A^2$ represents at least one kind of metal element other than Fe and a2 satisfies a relationship of $0 < a2 < 2$.

$A^2$ in Formula (1) is preferably at least one kind of metal element selected from the group consisting of Ga, Al, In, Nb, Co, Zn, Ni, Mn, Ti, and Sn.

Examples of the compound represented by Formula (1) include a compound represented by Formula (2), a compound represented by Formula (3), a compound represented by Formula (4), a compound represented by Formula (5), and a compound represented by Formula (6).

$$\varepsilon\text{-}Z^2_{z2}Fe_{2\text{-}z2}O_3 \qquad (2)$$

In Formula (2), $Z^2$ represents at least one kind of trivalent metal element selected from the group consisting of Ga, Al, In, and Nb. z2 satisfies a relationship of 0<z2<2. z2 preferably satisfies a relationship of 0<z2<1.8 and more preferably satisfies a relationship of 0.1<z2<1.2, from viewpoints of magnetic properties and stable formation of an ε phase.

Specific examples of the compound represented by Formula (2) include $\varepsilon\text{-}Ga_{0.25}Fe_{1.75}O_3$ and $\varepsilon\text{-}Ga_{0.5}Fe_{1.50}O_3$.

$$\varepsilon\text{-}X^2_{x2}Y^2_{y2}Fe_{2\text{-}x2\text{-}y2}O_3 \qquad (3)$$

In Formula (3), $X^2$ represents at least one kind of divalent metal element selected from the group consisting of Co, Ni, Mn, and Zn, and $Y^2$ represents at least one kind of tetravalent metal element selected from the group consisting of Ti and Sn. x2 satisfies a relationship of 0<x2<1 and y2 satisfies a relationship of 0<y2<1. x2 preferably satisfies a relationship of 0<x2<0.5, from viewpoints of magnetic properties and stable formation of an ε phase. y2 preferably satisfies a relationship of 0<y2<0.5, from viewpoints of magnetic properties and stable formation of an ε phase.

Specific examples of the compound represented by Formula (3) include $\varepsilon\text{-}Co_{0.05}Ti_{0.05}Fe_{1.9}O_3$ and $\varepsilon\text{-}Co_{0.07}Ti_{0.07}Fe_{1.86}O_3$.

$$\varepsilon\text{-}X^2_{x2}Z^2_{z2}Fe_{2\text{-}x2\text{-}z2}O_3 \qquad (4)$$

In Formula (4), $X^2$ represents at least one kind of divalent metal element selected from the group consisting of Co, Ni, Mn, and Zn, and $Z^2$ represents at least one kind of trivalent metal element selected from the group consisting of Ga, Al, In, and Nb. x2 satisfies a relationship of 0<x2<1 and z2 satisfies a relationship of 0<z2<1. x2 preferably satisfies a relationship of 0<x2<0.5, from viewpoints of magnetic properties and stable formation of an ε phase. z2 preferably satisfies a relationship of 0<z2<1.0, from viewpoints of magnetic properties and stable formation of an ε phase.

Specific examples of the compound represented by Formula (4) include $\varepsilon\text{-}Ga_{0.25}Co_{0.05}Fe_{1.7}O_3$ and $\varepsilon\text{-}Ga_{0.3}Co_{0.05}Fe_{1.65}O_3$.

$$\varepsilon\text{-}Y^2_{y2}Z^2_{z2}Fe_{2\text{-}y2\text{-}z2}O_3 \qquad (5)$$

In Formula (5), $Y^3$ represents at least one kind of tetravalent metal element selected from the group consisting of Ti and Sn, and $Z^2$ represents at least one kind of trivalent metal element selected from the group consisting of Ga, Al, In, and Nb. y2 satisfies a relationship of 0<y2<1 and z2 satisfies a relationship of 0<z2<1. y2 preferably satisfies a relationship of 0<z2<0.5, from viewpoints of magnetic properties and stable formation of an ε phase. z2 preferably satisfies a relationship of 0<z2<1.2, from viewpoints of magnetic properties and stable formation of an ε phase.

Specific examples of the compound represented by Formula (5) include $\varepsilon\text{-}Ga_{0.3}Ti_{0.05}Fe_{1.65}O_3$ and $\varepsilon\text{-}Ga_{0.25}Ti_{0.05}Fe_{1.7}O_3$.

$$\varepsilon\text{-}X^2_{x2}Y^2_{y2}Z^2_{z2}Fe_{2\text{-}x2\text{-}y2\text{-}z2}O_3 \qquad (6)$$

In Formula (6), $X^2$ represents at least one kind of divalent metal element selected from the group consisting of Co, Ni, Mn, and Zn, $Y^3$ represents at least one kind of tetravalent metal element selected from the group consisting of Ti and Sn, and $Z^2$ represents at least one kind of trivalent metal element selected from the group consisting of Ga, Al, In, and Nb. x2 satisfies a relationship of 0<x2<1, y2 satisfies a relationship of 0<y2<1, z2 satisfies a relationship of 0<z2<1, and x2+y2+z2<2. x2 preferably satisfies a relationship of 0<x2<1.5 and more preferably satisfies a relationship of 0<x2<1.0, y2 preferably satisfies a relationship of 0<y2<0.5 and more preferably satisfies a relationship of 0<y2<0.3, and z2 preferably satisfies a relationship of 0<z2<0.5 and more preferably satisfies a relationship of 0<z2<0.3, respectively, from viewpoints of magnetic properties and stable formation of an ε phase.

Specific examples of the compound represented by Formula (6) include $\varepsilon\text{-}Ga_{0.24}Co_{0.05}Ti_{0.05}Fe_{1.66}O_3$, $\varepsilon\text{-}Ga_{0.3}Co_{0.05}Ti_{0.05}Fe_{1.6}O_3$, $\varepsilon\text{-}Ga_{0.2}Co_{0.05}Ti_{0.05}Fe_{1.7}O_3$, and $\varepsilon\text{-}Ga_{0.5}Co_{0.01}Ti_{0.01}Fe_{1.48}O_3$.

In a case where the epsilon type iron oxide-based compound includes Fe, Ga, and Co, an atomic composition percentage of Ga atoms with respect to Fe atoms and Co atoms is preferably 0.2 atom % to 0.3 atom %.

In addition, in a case where the epsilon type iron oxide-based compound includes Ga, Co, and Ti, an atomic composition percentage of Ga atoms with respect to Co atoms and Ti atoms is preferably 0.03 atom % to 0.05 atom %.

Compositions of Epsilon Type Iron Oxide-Based Compound

The compositions of the epsilon type iron oxide-based compound are confirmed by a high-frequency inductively coupled plasma (ICP) emission spectral analysis method. Specifically, a vessel containing 12 mg of a sample of powder or particles including the compound and 10 ml of a hydrochloric acid aqueous solution having a concentration of 4 mol/L is held on a hot plate at a set temperature of 80° C. for 3 hours, and a solution is obtained. Then, the obtained solution is filtered by using a membrane filter having a hole diameter of 0.1 μm. The element analysis of the filtrate obtained as described above is performed by using a high-frequency inductively coupled plasma (ICP) emission spectral analysis device. A content of each metal atom with respect to 100 atom % of iron atoms is obtained based on the result obtained from the element analysis.

Magnetic Recording Medium

A magnetic recording medium of this disclosure includes the epsilon type iron oxide-based compound particles. The epsilon type iron oxide-based compound particles in the magnetic recording medium includes ferromagnetic powder described below.

In addition, the epsilon type iron oxide-based compound particles included in the magnetic recording medium are preferably epsilon type iron oxide-based compound particles obtained by the manufacturing method of the epsilon type iron oxide-based compound particles of this disclosure.

The epsilon type iron oxide-based compound particles included in the magnetic recording medium are preferably cores of calcinated products obtained by calcinating the core-shell particles of this disclosure.

The magnetic recording medium includes a non-magnetic support, and a magnetic layer including ferromagnetic powder and a binding agent. The ferromagnetic powder preferably includes epsilon type iron oxide-based compound particles.

The magnetic recording medium may include other layers according to the purpose. Examples of the other layers which can be included in the magnetic recording medium include a non-magnetic layer, a back coating layer, and the like. The other layers will be described later.

Non-Magnetic Support

The non-magnetic support indicates a support not having magnetism. Hereinafter, the non-magnetic support may be simply referred to as a "support".

The expression "not having magnetism" indicates a state where a residual magnetic flux density is equal to or smaller than 10 mT, a state where coercivity is equal to or smaller than 7.98 kA/m (100 Oe), or a state where a residual magnetic flux density is equal to or smaller than 10 mT and coercivity is equal to or smaller than 7.98 kA/m (100 Oe), and preferably means that neither residual magnetic flux density nor coercivity is obtained.

As the non-magnetic support, a base material formed by a material not having magnetism, for example, a resin material not including a magnetic material, an inorganic material not having magnetism, and the like can be used. The material used for forming the non-magnetic support can be suitably selected from materials satisfying requirements such as physical properties such as formability necessary for a magnetic recording medium or durability of the formed non-magnetic support.

The non-magnetic support is selected according to the usage aspect of the magnetic recording medium. For example, in a case where the magnetic recording medium is a magnetic tape or the like, a resin film having flexibility can be used as the non-magnetic support. In a case where the magnetic recording medium is a hard disk or the like, a resin formed body, an inorganic material formed body, or a metal material formed body which has a disk shape can be used as the non-magnetic support.

Examples of the resin material used for forming the non-magnetic support include a resin material such as polyester such as polyethylene terephthalate (PET) or polyethylene naphthalate (PEN), polyolefin such as polyethylene or polypropylene, an amide-based resin such as aromatic polyamide including polyamide, polyamide imide, or polyaramide, polyimide, cellulose triacetate (TAC), polycarbonate (PC), polysulfone, and polybenzoxazole. It is possible to form the non-magnetic support by suitably selecting the resin material from the resin materials described above.

Among these, from viewpoints of excellent hardness and durability and ease of processing, polyester and an amide-based resin are preferable, Polyethylene terephthalate, polyethylene naphthalate, and polyamide are more preferable.

In a case of using the resin material in the non-magnetic support such as a magnetic tape, the resin material is formed in a film shape. As a method of forming the resin material in a film shape, a well-known method can be used.

A resin film may be an unstretched film or may be a uniaxially stretched film or a biaxially stretched film. For example, in a case of using polyester, a biaxially stretched polyester film can be used, in order to improve dimensional stability.

In addition, a film having a laminated structure of two or more layers can also be used, according to the purpose. That is, as disclosed in JP1991-224127A (JP-H03-224127A), for example, a non-magnetic support obtained by laminating a film including two different layers can also be used, in order to change surface roughness of a surface on which a magnetic layer is formed and a surface on which a magnetic layer is not formed.

A thickness of the non-magnetic support is not particularly limited and can be suitably set according to the use of the magnetic recording medium. The thickness of the non-magnetic support is preferably 3.0 µm to 80.0 µm. For example, in a case where the magnetic recording medium is a magnetic tape, the thickness of the non-magnetic support is preferably 3.0 µm to 6.5 µm, more preferably 3.0 µm to 6.0 µm, and even more preferably 3.3 µm to 5.5 µm.

The thicknesses of the non-magnetic support and each layer of the magnetic recording medium which will be described later can be acquired by exposing a cross section of the magnetic recording medium in a thickness direction by a well-known method such as ion beams or a microtome, performing cross section observation regarding the exposed cross section with a scanning electron microscope, and obtaining a thickness of a portion in a thickness direction in the cross section observation or obtaining an arithmetical mean of thicknesses obtained in randomly extracted two or more of plural portions (for example, two portions).

Magnetic Layer

The magnetic layer is a layer contributing to magnetic recording. The magnetic layer preferably includes a layer including ferromagnetic powder as a magnetic material, and a binding agent which is a film forming component, and may further include additives, according to the purpose.

Ferromagnetic Powder

The ferromagnetic powder of the magnetic layer includes epsilon type iron oxide-based compound particles of this disclosure.

Regarding the epsilon type iron oxide-based compound particles included in the ferromagnetic powder, an average primary particle diameter is preferably 6.0 nm to 20 nm, a coefficient of variation of primary particle diameter is preferably smaller than 0.4, the average primary particle diameter is more preferably 7.0 nm to 20 nm, the coefficient of variation of primary particle diameter is more preferably smaller than 0.4, the average primary particle diameter is even more preferably 10 nm to 15 nm, the coefficient of variation of primary particle diameter is even more preferably smaller than 0.4, and the average primary particle diameter is most preferably 10 nm to 12 nm, the coefficient of variation of primary particle diameter is most preferably smaller than 0.4. Since the epsilon type iron oxide-based compound particles have such average primary particle diameter and coefficient of variation of primary particle diameter, excellent SNR and running durability can be exhibited, in a case where the epsilon type iron oxide-based compound particles are used in a magnetic recording medium.

In addition, regarding the epsilon type iron oxide-based compound particles included in the ferromagnetic powder, the average primary particle diameter is preferably 6.0 nm to 20 nm, the coefficient of variation of primary particle diameter is preferably smaller than 0.3, the average primary particle diameter is more preferably 7.0 nm to 20 nm, the coefficient of variation of primary particle diameter is more preferably smaller than 0.3, the average primary particle diameter is even more preferably 10 nm to 15 nm, the coefficient of variation of primary particle diameter is even more preferably smaller than 0.3, and the average primary particle diameter is most preferably 10 nm to 12 nm, the coefficient of variation of primary particle diameter is most preferably smaller than 0.3. Since the epsilon type iron oxide-based compound particles have such average primary particle diameter and coefficient of variation of primary particle diameter, more excellent SNR and running durability can be exhibited, in a case where the epsilon type iron oxide-based compound particles are used in a magnetic recording medium.

The epsilon type iron oxide-based compound particles included in the ferromagnetic powder are preferably epsilon type iron oxide-based compound particles obtained by the manufacturing method of the epsilon type iron oxide-based compound particles of this disclosure.

In addition, the epsilon type iron oxide-based compound particles included in the ferromagnetic powder are preferably cores of calcinated products obtained by calcinating the core-shell particles of this disclosure.

The average primary particle diameter of the epsilon type iron oxide-based compound particles can be obtained by the same procedure as that of the "average primary particle diameter of the core-shell particles".

A content (filling percentage) of the ferromagnetic powder in the magnetic layer is preferably 50% by mass to 90% by mass and more preferably 60% by mass to 90% by mass with respect to dry mass of the magnetic layer. The filling percentage of the ferromagnetic powder in the magnetic layer is set to be equal to or greater than 50% by mass with respect to dry mass of the magnetic layer, thereby improving recording density.

Binding Agent

The binding agent is selected from film forming resins which are useful for forming the magnetic layer including the ferromagnetic powder described above.

The resin used for the binding agent is not particularly limited, as long as it can form a resin layer satisfying various physical properties such as desired hardness or durability. The resin can be suitably selected from well-known film forming resins according to the purpose and used as the binding agent.

The resin used for the binding agent may be a homopolymer or a copolymer. The resin used for the binding agent may be a well-known electron beam-curable resin.

As the resin used for the binding agent, a material selected from polyurethane, polyester, polyamide, a vinyl chloride resin, styrene, acrylonitrile, an acrylic resin obtained by (co)polymerization of methyl methacrylate, a cellulose resin such as nitrocellulose, an epoxy resin, a phenoxy resin, a polyvinylalkylal resin such as polyvinyl acetal or polyvinyl butyral can be used alone, or the plurality of resins can be used in a mixed manner. Preferable materials among these are polyurethane, the acrylic resin, the cellulose resin, and the vinyl chloride resin.

In order to further improve dispersibility of the ferromagnetic powder included in the magnetic layer, the resin which is the binding agent preferably includes a functional group which can be adsorbed to the surface of the powder, for example, a polar group in a molecule. Examples of the preferable functional group which can be included in the resin which is the binding agent include —$SO_3M$, —$SO_4M$, —$PO(OM)_2$, —$OPO(OM)_2$, —COOM, =$NSO_3M$, =$NRSO_3M$, —$NR_1R_2$, and —$N^+R_1R_2R_3X^-$. Here, M represents a hydrogen atom or an alkali metal atom such as Na or K. R represents an alkylene group, $R_1$, $R_2$, and $R_3$ each independently represent a hydrogen atom, an alkyl group, or a hydroxyalkyl group. X represents a halogen atom such as Cl or Br.

In a case where the resin which is the binding agent includes the functional group, the content of the functional group in the resin is preferably 0.01 meq/g to 2.0 meq/g, and more preferably 0.3 meq/g to 1.2 meq/g. It is preferable that the content of functional group in the resin is set to be in the range described above, because dispersibility of the ferromagnetic powder and the like in the magnetic layer is further improved and magnetic flux density is further improved.

Among these, the resin used for the binding agent is more preferably polyurethane including a —$SO_3Na$ group. In a case where polyurethane includes the —$SO_3Na$ group, the content of —$SO_3Na$ group is preferably 0.01 meq/g to 1.0 meq/g with respect to that of polyurethane.

As the binding agent, a commercially available resin can be suitably used.

An average molecular weight of the resin used as the binding agent can be, for example, 10,000 to 200,000 as a weight-average molecular weight.

The weight-average molecular weight in this disclosure is a value obtained by performing polystyrene conversion of a value measured by gel permeation chromatography (GPC). As the measurement conditions, the following conditions can be used.

GPC device: HLC-8120 (manufactured by Tosoh Corporation)
Column: TSK gel Multipore HXL-M (manufactured by Tosoh Corporation, 7.8 mmID (inner diameter)×30.0 cm)
Eluent: Tetrahydrofuran (THF)
Sample concentration: 0.5% by mass
Sample injection amount: 10 µl
Flow rate: 0.6 ml/min
Measurement temperature: 40° C.
Detector: RI detector The content of the binding agent in the magnetic layer can be 1 part by mass to 30 parts by mass and is preferably 2 parts by mass to 20 parts by mass with respect to 100 parts by mass of the ferromagnetic powder.

Other Additives

The magnetic layer can include various additives, if necessary, in addition to the ferromagnetic powder and the binding agent described above, within a range not negatively affecting the effects of the magnetic layer.

Examples of the additives include an abrasive, a lubricant, a dispersing agent, a dispersing assistant, an antibacterial agent, an antistatic agent, an antioxidant, and carbon black. In addition, as the additives, colloid particles as an inorganic filler can be used, if necessary.

As the additive, a commercially available product can be suitably used according to desired properties.

Non-Magnetic Layer

The non-magnetic layer is a layer contributing to thinning of the magnetic layer. The non-magnetic layer is preferably a layer including non-magnetic powder as a filler and a binding agent which is a film forming component, and may further include additives, if necessary.

The non-magnetic layer can be provided between the non-magnetic support and the magnetic layer. The non-magnetic layer includes a layer not having magnetism, and a substantially non-magnetic layer including a small amount of ferromagnetic powder as impurities or intentionally.

Here, the "non-magnetic" state indicates a state where a residual magnetic flux density is equal to or smaller than 10 mT, a state where coercivity is equal to or smaller than 7.98 kA/m (100 Oe), or a state where a residual magnetic flux density is equal to or smaller than 10 mT and coercivity is equal to or smaller than 7.98 kA/m (100 Oe), and preferably means that neither of residual magnetic flux density and coercivity is obtained.

Non-Magnetic Powder

The non-magnetic powder is powder not having magnetism, which functions as a filler. The non-magnetic powder used in the non-magnetic layer may be inorganic powder or organic powder. In addition, carbon black or the like can also be used. Examples of the inorganic powder include particles of metal, metal oxide, metal carbonate, metal sulfate, metal nitride, metal carbide, and metal sulfide. The non-magnetic powder can be used alone or in combination of two or more kinds thereof. The non-magnetic powder can be purchased as a commercially available product or can be manufactured by a well-known method.

Specifically, titanium oxide such as titanium dioxide, cerium oxide, tin oxide, tungsten oxide, ZnO, $ZrO_2$, $SiO_2$, $Cr_2O_3$, α-alumina having an a transformation rate of 90% to 100%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide can be used alone or in combination of two or more kinds thereof. α-iron oxide and titanium oxide are preferable.

The shape of the non-magnetic powder may be any of a needle shape, a sphere shape, a polyhedron shape, and a plate shape. A crystallite size of the non-magnetic powder is preferably 4 nm to 500 nm and more preferably 40 nm to 100 nm. It is preferable that the crystallite size is 4 nm to 500 nm, because suitable surface roughness is obtained without any difficulties regarding dispersion. An average particle diameter of these non-magnetic powders is preferably 5 nm to 500 nm, and the same effect can also be exhibited by combining non-magnetic powders having different average particle diameters, if necessary, or widening the particle size distribution even with a single non-magnetic powder. The average particle diameter of the non-magnetic powder is particularly preferably 10 nm to 200 nm. It is preferable that the average particle diameter of the non-magnetic powder is 5 nm to 500 nm, because dispersion is performed in an excellent manner and suitable surface roughness is obtained.

A content (filling percentage) of the non-magnetic powder in the non-magnetic layer is preferably 50% by mass to 90% by mass and more preferably 60% by mass to 90% by mass.

The "binding agent" and the "additive" of the non-magnetic layer are the same as the "binding agent" and the "additive" described in the section of the "magnetic layer" and the preferable aspects are also the same as the preferable aspects thereof.

A thickness of the non-magnetic layer is preferably 0.05 μm to 3.0 μm, more preferably 0.05 μm to 2.0 μm, and even more preferably 0.05 μm to 1.5 μm.

Back Coating Layer

A back coating layer is a layer contributing to temporal stability, running stability, and the like. The back coating layer is preferably a layer including non-magnetic powder as a filler, and a binding agent which is a film forming component, and may further include additives, according to the purpose.

The back coating layer can be provided on a surface of the non-magnetic support on a side opposite to the magnetic layer side.

The "non-magnetic powder" of the back coating layer is the same as the "non-magnetic powder" described in the section of the "non-magnetic layer" and the preferable aspect is also the same as the preferable aspect thereof. In addition, the "binding agent" and the "additive" of the back coating layer are the same as the "binding agent" and the "additive" described in the section of the "magnetic layer" and the preferable aspects are also the same as the preferable aspects thereof.

A thickness of the back coating layer is preferably equal to or smaller than 0.9 μm and more preferably 0.1 μm to 0.7 μm.

Manufacturing Method of Magnetic Recording Medium

A manufacturing method of the magnetic recording medium of this disclosure includes a step of preparing a magnetic layer forming composition including epsilon type iron oxide-based compound particles (step C), a step of applying the magnetic layer forming composition onto a non-magnetic support (step D), and a step of drying the magnetic layer forming composition on the non-magnetic support to form a magnetic layer (step E).

The epsilon type iron oxide-based compound particles are preferably cores of calcinated products obtained by calcinating the core-shell particles.

Step C

The manufacturing method of the magnetic recording medium of this disclosure includes a step of preparing a magnetic layer forming composition including epsilon type iron oxide-based compound particles (step C).

Regarding the epsilon type iron oxide-based compound particles, an average primary particle diameter is preferably 6.0 nm to 20 nm, a coefficient of variation of primary particle diameter is preferably smaller than 0.4, the average primary particle diameter is more preferably 7.0 nm to 20 nm, the coefficient of variation of primary particle diameter is more preferably smaller than 0.4, the average primary particle diameter is even more preferably 10 nm to 15 nm, the coefficient of variation of primary particle diameter is even more preferably smaller than 0.4, and the average primary particle diameter is most preferably 10 nm to 12 nm, the coefficient of variation of primary particle diameter is most preferably smaller than 0.4. Since the epsilon type iron oxide-based compound particles have such average primary particle diameter and coefficient of variation of primary particle diameter, excellent SNR and running durability can be exhibited, in a case where the epsilon type iron oxide-based compound particles are used in a magnetic recording medium.

In addition, regarding the epsilon type iron oxide-based compound particles, the average primary particle diameter is preferably 6.0 nm to 20 nm, the coefficient of variation of primary particle diameter is preferably smaller than 0.3, the average primary particle diameter is more preferably 7.0 nm to 20 nm, the coefficient of variation of primary particle diameter is more preferably smaller than 0.3, the average primary particle diameter is even more preferably 10 nm to 15 nm, the coefficient of variation of primary particle diameter is even more preferably smaller than 0.3, and the average primary particle diameter is most preferably 10 nm to 12 nm, the coefficient of variation of primary particle diameter is most preferably smaller than 0.3. Since the epsilon type iron oxide-based compound particles have such average primary particle diameter and coefficient of variation of primary particle diameter, more excellent SNR and running durability can be exhibited, in a case where the epsilon type iron oxide-based compound particles are used in a magnetic recording medium.

In addition, the epsilon type iron oxide-based compound particles are preferably epsilon type iron oxide-based compound particles obtained by the manufacturing method of the epsilon type iron oxide-based compound particles of this disclosure.

The epsilon type iron oxide-based compound particles included in the ferromagnetic powder are preferably cores of calcinated products obtained by calcinating the core-shell particles of this disclosure.

The average primary particle diameter of the epsilon type iron oxide-based compound particles can be obtained by the same procedure as that of the "average primary particle diameter of the core-shell particles".

The step C includes adding and dispersing ferromagnetic powder including the epsilon type iron oxide-based compound particles, a binding agent, and, if necessary, additives in a solvent.

The "ferromagnetic powder", the "binding agent" and the "additive" for preparing the composition are the same as the "ferromagnetic powder", the "binding agent" and the "additive" described in the section of the "magnetic layer" and the preferable aspects are also the same as the preferable aspects thereof.

All of the raw materials such as the ferromagnetic powder, the binding agent, the non-magnetic powder, and additives of this disclosure may be added in an initial or middle stage of the step C.

The raw materials may be added at the same time or may be added in two or more parts. For example, after adding the binding agent in a step for dispersing the components, the binding agent can be further added for adjusting viscosity after the dispersion.

In the dispersion of the raw materials of the magnetic layer forming composition, a well-known dispersion apparatus such as a batch type vertical sand mill or a transverse beads mill can be used, for example. As the dispersion beads, glass beads, zirconia beads, titania beads, and steel beads can be used, for example. A particle diameter (bead diameter) and a filling percentage of the dispersion beads can be optimized and used.

In addition, the dispersion of the raw materials of the magnetic layer forming composition can also be performed by using a well-known ultrasonic device, for example.

Further, at least some raw materials of the magnetic layer forming composition can also be kneaded by using an open kneader, for example, before the dispersion.

Regarding the raw materials of the magnetic layer forming composition, solutions for the raw materials may be respectively prepared and mixed with each other. For example, a magnetic liquid including ferromagnetic powder an abrasive solution including the abrasive can be respectively prepared, and mixed with each other for dispersion.

A content of the ferromagnetic powder in the composition is preferably 5% by mass to 50% by mass and more preferably 10% by mass to 30% by mass, with respect to a total mass of the magnetic layer forming composition.

A content of the binding agent in the magnetic layer forming composition is preferably 1 part by mass to 30 parts by mass and more preferably 2 parts by mass to 20 parts by mass with respect to 100 parts by mass of the ferromagnetic powder.

Solvent

The solvent is a medium for dispersing the ferromagnetic powder, the binding agent, and if necessary, the additives.

One kind of the solvent may be used or a mixed solvent of two or more kinds may be used. As the solvent, an organic solvent is preferable.

As the organic solvent, a ketone-based compound such as acetone, methyl ethyl ketone, methyl isobutyl ketone, diisobutyl ketone, cyclohexanone, isophorone, or tetrahydrofuran, an alcohol-based compound such as methanol, ethanol, propanol, butanol, isobutyl alcohol, isopropyl alcohol, or methylcyclohexanol, an ester-based compound such as methyl acetate, butyl acetate, isobutyl acetate, isopropyl acetate, ethyl lactate, or glycol acetate, a glycol ether-based compound such as glycol dimethyl ether, glycol monoethyl ether, or dioxane, an aromatic hydrocarbon-based compound such as benzene, toluene, xylene, cresol, or chlorobenzene, a chlorinated hydrocarbon-based compound such as methylene chloride, ethylene chloride, carbon tetrachloride, chloroform, ethylene chlorohydrin, or dichlorobenzene, N, N-dimethylformamide, hexane, and the like can be used, for example. Preferable examples of the organic solvent include methyl ethyl ketone, cyclohexanone, and a mixed solvent including these at any ratio.

In order to improve dispersibility, a solvent having strong polarity to some extent is preferable, and it is preferable that a content of a solvent having dielectric constant equal to or greater than 15 is equal to or greater than 50% by mass with respect to a total content of the solvent. In addition, a dissolution parameter is preferably 8 to 11.

Step D

The manufacturing method of the magnetic recording medium of this disclosure includes a step of applying the magnetic layer forming composition onto the non-magnetic support (step D).

As a coating method of applying the composition, a well-known method such as air doctor coating, blade coating, rod coating, extrusion coating, air knife coating, squeeze coating, impregnation coating, reverse roll coating, transfer roll coating, gravure coating, kiss coating, cast coating, spray coating, spin coating can be used. Regarding the coating method, "Latest coating technologies" published by Sogo Gijutsu Center (31 May 1983) can be referred to, for example.

Alignment in Magnetic Field

After applying the magnetic layer forming composition including the epsilon type iron oxide-based compound particles onto the non-magnetic support, it is preferable to perform alignment in magnetic field of a coating layer of the composition, before drying the composition. In a case of a magnetic tape, the alignment in magnetic field of the coating layer of the composition is preferably performed with respect to the epsilon type iron oxide-based compound particles which are a ferromagnetic material included in the composition by using cobalt magnets or solenoid. In a case of a disk, isotropic orientation is sufficiently obtained without performing an alignment process without using an alignment device. A well-known random alignment device is preferably used by obliquely alternately disposing cobalt magnets or applying an alternating magnetic field by solenoid. In addition, isotropic magnetic properties can also be applied in a circumferential direction by performing homeotropic alignment by using a well-known method performed with a polar opposing magnet. Particularly, in a case of performing high-density recording, homeotropic alignment is preferable. In addition, circumferential alignment can also be performed by using a spin coating.

Step E

The manufacturing method of the magnetic recording medium of this disclosure includes a step of drying the magnetic layer forming composition on the non-magnetic support to form a magnetic layer (step E).

The magnetic layer is formed by drying the composition including the epsilon type iron oxide-based compound particles which is a ferromagnetic material on the non-magnetic support.

Drying

The composition on the non-magnetic support can be dried by a well-known method. It is possible to control a drying position of a coating film by controlling a temperature of dry air, an air flow, or an application speed, and for example, the application speed is preferably 20 m/min to 1,000 m/min and a temperature of the dry air is preferably equal to or higher than 60° C. In addition, suitable preliminary drying can be performed before applying a magnetic field.

Calendar Process

The manufacturing method of the magnetic recording medium preferably includes performing a calendar process with respect to the non-magnetic support including the magnetic layer, after the step E.

The non-magnetic support including the magnetic layer is temporarily wound with a winding roll, unwound from the winding roll, and supplied for the calendar process. By performing the calendar process, surface smoothness is improved, and a filling percentage of the ferromagnetic powder in the magnetic layer is improved due to disappearance of holes generated due to removal of the solvent at the time of drying. Accordingly, it is possible to obtain a magnetic recording medium having high electromagnetic conversion characteristics. The step of performing the calendar process is preferably performed while changing calendar process conditions according to smoothness of the surface of the magnetic layer.

In the calendar process, a super calendar roll or the like can be used, for example.

As a calendar roll, a heat resistant plastic roll such as epoxy, polyimide, polyamide, or polyamideimide can be used. In addition, the process can also be performed by a metal roll.

As the calendar process conditions, a temperature of the calendar roll is, for example, 60° C. to 120° C. and can be preferably set as 80° C. to 100° C., and pressure is, for example, 100 kg/cm to 500 kg/cm (98 kN/m to 490 kN/m) and can be preferably set as 200 to 450 kg/cm (196 to 441 kN/m).

Step of Forming any Layer Such as Non-Magnetic Layer and Back Coating Layer

The manufacturing method of the magnetic recording medium of this disclosure can include a step of forming any layer such as the non-magnetic layer and the back coating layer.

The non-magnetic layer and the back coating layer can be formed by performing the same steps as the "step C", the "step D", and the "step E".

As described in the sections of the "non-magnetic layer" and the "back coating layer", the non-magnetic layer can be provided between the non-magnetic support and the magnetic layer, and the back coating layer can be provided on a surface of the non-magnetic support on a side opposite to the magnetic layer side.

A forming composition of the non-magnetic layer and a forming composition of the back coating layer can be prepared with components and the contents described in the sections of the "non-magnetic layer" and the "back coating layer".

EXAMPLES

Hereinafter, this disclosure will be described with reference to examples more specifically with reference to examples, but the invention is not limited to the following examples, as long as other examples are not departed from the gist thereof. "Parts" and "%" are based on mass, unless otherwise noted.

Example 1

Raw Material A 8.2 g of iron (III) nitrate nonahydrate and 1.13 g of polyvinylpyrrolidone (PVP) were dissolved in 90 g of pure water, while stirring by using a magnetic stirrer, in an atmosphere under the conditions of 25° C., and 3.8 g of a 25% by mass ammonia aqueous solution was added thereto and stirred for 2 hours. A solution obtained by dissolving 0.9 g of citric acid to 9.2 g of water was added to this solution and stirred for 1 hour. Precipitated powder was collected by centrifugal separation, washed with pure water, and dried at 80° C., thereby obtaining powder A. The generation of β-iron oxyhydroxide was confirmed from an XRD pattern of the powder A. The analysis was performed by using X'Pert PRO (manufactured by PANanalytical) as an XRD device.

1.1 g of oleic acid was added to 1 g of the powder A to crush the powder with an automatic mortar for 24 hours, thereby obtaining paste-like raw material A. While vigorously stirring 185 ml of cyclohexane, 7.6 ml of IGEPAL (registered trademark) CO520 (manufactured by Rhodia Inc.) was added thereto as a surfactant and stirred for 1 hour, and 2.1 ml of a 25% by mass ammonia aqueous solution (manufactured by Wako Pure Chemical Industries, Ltd.), the raw material A, 0.38 g of gallium (III) nitrate octahydrate, 65 mg of cobalt (II) nitrate hexahydrate, and 51 mg of titanium (IV) sulfate were added and continuously stirred for 60 minutes. Then, 5.1 mL of tetraethoxysilane (TEOS) was added dropwise for 1 hour and further stirred in a constant-temperature tank at 25° C. for 24 hours. 150 ml of ethanol was added to this solution, the generated precipitate was collected by decantation, washed with ethanol 3 times in total, and dried at 80° C., thereby obtaining powder B. By observing this powder B with a transmission electron microscope (TEM), the formation of core-shell particles in which β-iron oxyhydroxide was provided as a core and $SiO_2$ which was a polycondensate of metal alkoxide was provided as a shell was confirmed. In addition, by performing TEM-EDS analysis (high-resolution transmission type microscope Talos manufactured by FEI) regarding the same sample, the metal element other than iron which was detected only in the shell part and not in the core part was confirmed.

In addition, a Fe/Si element mass ratio converted from a ratio of the area of the core part and the area of the shell part, and atomic weights of silicon and iron were calculated as 1/10.

A furnace was filled with the obtained powder B, and heat treatment was performed under atmosphere at 1,037° C. for 4 hours, thereby obtaining heat-treated powder. The heat-treated powder was put into a 4 mol/L sodium hydroxide (NaOH) aqueous solution and stirred at a liquid temperature of 70° C. for 24 hours, thereby removing silicon oxide from the heat-treated powder. A residue was collected by centrifugal separation and washed with pure water, and thus, epsilon type iron oxide-based compound particles ($\varepsilon$-$Ga_{0.24}Co_{0.05}Ti_{0.05}Fe_{1.66}O_3$) having a $\varepsilon$-$Fe_2O_3$ phase were obtained. The measurement regarding the composition of the epsilon type iron oxide-based compound was performed by the method described in the section of the "Composition of Epsilon Type Iron Oxide-Based Compound" described above. An average primary particle diameter of the epsilon type iron oxide-based compound particles calculated by a method which will be described later was 11.1 nm.

Average Primary Particle Diameter and Coefficient of Variation

The powder of the epsilon type iron oxide-based compound particles was imaged at a magnification ratio of 80,000 by using a transmission electron microscope H-9000 manufactured by Hitachi, Ltd., the image was printed on photographic printing paper so that the total magnification becomes 500,000, and an image of the epsilon type iron oxide-based compound particles was obtained. Any particle was selected from the obtained image of the particles, an outline of the particle was traced with a digitizer, and a diameter (equivalent circle area diameter) of a circle having the same area as the traced region was calculated, thereby obtaining a "primary particle diameter". In the calculation of the equivalent circle area diameter, well-known image analysis software, for example, image analysis software KS-400 manufactured by Carl Zeiss was used. The primary particle diameter is a particle diameter of an independent particle which is not aggregated.

An arithmetical mean of the primary particle diameters of the 500 epsilon type iron oxide-based compound particles obtained as described above was set as an "average primary particle diameter".

The following evaluation was performed by using a "coefficient of variation" which is a value obtained by dividing a standard deviation of the primary particle diameters of the 500 epsilon type iron oxide-based compound particles by the average primary particle diameter.

Evaluation of Size Distribution

The size distribution was evaluated as follows based on the value of the coefficient of variation obtained based on the primary particle diameters of the epsilon type iron oxide-based compound particles which are cores after calcinating the core-shell particles of this disclosure. The evaluation result is shown in Table 1.

5: coefficient of variation is smaller than 0.3. (Excellent level with the smallest size distribution)

4: coefficient of variation is equal to or greater than 0.3 and smaller than 0.4.

3: coefficient of variation is equal to or greater than 0.4 and smaller than 0.5.

2: coefficient of variation is equal to or greater than 0.5 and smaller than 0.6.

1: coefficient of variation is equal to or greater than 0.6.

Example 2

Core-shell particles were obtained in the same manner as in Example 1, except that the raw material A was changed with the raw material B obtained below. Epsilon type iron oxide-based compound particles ($\varepsilon$-$Ga_{0.24}Co_{0.05}Ti_{0.05}Fe_{1.66}O_3$) were obtained in the same manner as in Example 1, except that the calcinating conditions for the core-shell particles were changed to perform the calcinating at 1,097° C. for 12.5 hours. The measurement regarding the composition of the epsilon type iron oxide-based compound was performed by the same method described in the section of the "Composition of Epsilon Type Iron Oxide-Based Compound" described above. An average primary particle diameter of the obtained epsilon type iron oxide-based compound particles was 10.2 nm.

Raw Material B 104 g of 1-octadecene, 18.1 g of iron (III) stearate, and 2.1 g of oleic acid were added into a three-neck flask, a reflux tube, a thermocouple, and a heat resistant stirrer chip were put therein, the mixture was heated to 315° C. at a rate of temperature increase of 3.3° C./min while stirring. After that, the mixture was continuously stirred at approximately 315° C. for 35 minutes, the temperature was returned to room temperature, thereby a black dispersion liquid was obtained.

The dispersion liquid was moved into a vessel for centrifugal separation, 240 ml of cyclohexane was added thereto and vigorously shaken, the centrifugal separation was performed at 7,600 rpm for 12 minutes, precipitate was collected, washed with cyclohexane three times in total, and dried at 80° C., thereby obtaining a raw material B. The generation of iron oxide ($Fe_3O_4$) having a spinel structure with a mixed crystal was confirmed from an XRD pattern of the raw material B. The analysis was performed by using X'Pert PRO (manufactured by PANanalytical) as an XRD device.

In addition, from the TEM observation of the raw material B, the formation of core-shell particles in which iron oxide having a spinel structure was provided as a core and $SiO_2$ was provided as a shell was confirmed. The measurement regarding the composition of the iron oxide was performed by the method described in the section of the "Composition of Epsilon Type Iron Oxide-Based Compound" described above.

In addition, by performing TEM-EDS analysis (high-resolution transmission type microscope Talos manufactured by FEI) regarding the same sample, the element other than iron which was detected only in the shell part and not in the core part was confirmed. A Fe/Si element mass ratio converted from a ratio of the area of the core part and the area of the shell part, and atomic weights of silicon and iron were calculated as 1/9.

Example 3

Core-shell particles were prepared in the same manner as in Example 1, except that the amount of tetraethoxy silane of Example 1 added was set as 0.6 ml, and an epsilon type iron oxide-based compound was obtained.

Example 4

Core-shell particles were prepared in the same manner as in Example 1, except that the amount of tetraethoxy silane of Example 1 added was set as 2.3 ml, and an epsilon type iron oxide-based compound was obtained.

Example 5

Core-shell particles were prepared in the same manner as in Example 1, except that the amount of tetraethoxy silane of Example 1 added was set as 8.2 ml, and an epsilon type iron oxide-based compound was obtained.

Example 6

Core-shell particles were prepared in the same manner as in Example 1, except that the amount of tetraethoxy silane of Example 1 added was set as 15.9 ml, and an epsilon type iron oxide-based compound was obtained.

Example 7

Core-shell particles were prepared in the same manner as in Example 2, except that the amount of tetraethoxy silane of Example 2 added was set as 0.6 ml, and an epsilon type iron oxide-based compound was obtained.

Example 8

Core-shell particles were prepared in the same manner as in Example 2, except that the amount of tetraethoxy silane of Example 2 added was set as 2.5 ml, and an epsilon type iron oxide-based compound was obtained.

Example 9

Core-shell particles were prepared in the same manner as in Example 2, except that the amount of tetraethoxy silane of Example 2 added was set as 8.4 ml, and an epsilon type iron oxide-based compound was obtained.

Example 10

Core-shell particles were prepared in the same manner as in Example 2, except that the amount of tetraethoxy silane of Example 2 added was set as 16.2 ml, and an epsilon type iron oxide-based compound was obtained.

Example 11

Core-shell particles were prepared in the same manner as in Example 1, except that the amount of gallium (III) nitrate octahydrate was changed to 0.79 g, the amount of cobalt (II) nitrate hexahydrate was changed to 33 mg, and the amount of titanium (IV) sulfate was changed to 25 mg, and an epsilon type iron oxide-based compound ($\varepsilon$-$Ga_{0.49}Co_{0.025}Ti_{0.025}Fe_{1.46}O_3$) was obtained.

Example 12

Core-shell particles were prepared in the same manner as in Example 2, except that the amount of gallium (III) nitrate octahydrate was changed to 0.78 g, the amount of cobalt (II) nitrate hexahydrate was changed to 32 mg, and the amount of titanium (IV) sulfate was changed to 26 mg, and an epsilon type iron oxide-based compound ($\varepsilon$-$Ga_{0.49}Co_{0.025}Ti_{0.025}Fe_{1.46}O_3$) was obtained.

Example 13

Core-shell particles were prepared in the same manner as in Example 1, except that the amount of gallium (III) nitrate octahydrate was changed to 1.16 g, and cobalt (II) nitrate hexahydrate and titanium (IV) sulfate were not added, and an epsilon type iron oxide-based compound ($\varepsilon$-$Ga_{0.74}Fe_{1.26}O_3$) was obtained.

Example 14

Core-shell particles were prepared in the same manner as in Example 2, except that the amount of gallium (III) nitrate octahydrate was changed to 1.18 g, and cobalt (II) nitrate hexahydrate and titanium (IV) sulfate were not added, and an epsilon type iron oxide-based compound ($\varepsilon$-$Ga_{0.75}Fe_{1.25}O_3$) was obtained.

Comparative Example 1

A sample was prepared according to the description disclosed in Example 1 of JP2015-153918A, and the evaluation was performed. The details thereof are as follows.

28.3 g of water was added to 48.9 g of nital (solution obtained by adding 3.1% of nitric acid by volume to methanol) and stirred to be even. 32 g of a tetramer of tetramethoxy silane (manufactured by Tama Chemicals Co., Ltd., product name: silicate) as tetraalkoxysilanes was slowly added to this solution. Methanol and water which are solvents in this solution were concentrated while evaporating, and a solution was thickened. In a case where the viscosity of this solution becomes approximately 1 Pa·s to 5 Pa. s, FeCo alloy powder (Fe: 70% by mass) as Fe-containing powder was mixed with this solution and vigorously stirred. The mixed amount of the FeCo alloy powder was set so that the Fe/Si element mass ratio in the finally obtained composition obtained from the TEM observation becomes 1/10. An average primary particle diameter of the FeCo alloy powder used was 0.96 µm.

The obtained gel substance was dried, solidified, and crushed by using a mortar. This crushed material was heated and dried under the conditions of a temperature of 120° C. for 20 hours by using a vacuum oven (equal to or smaller than 18 hPa). This dried material was calcinated in a vacuum high-temperature heat treatment furnace. The material was heated to 1,208° C. at a rate of temperature increase of 245° C./hour as the calcinating conditions, held at 1,200° C. for 3.5 hours, and cooled to room temperature. As a result of the observation of the obtained powder with a TEM, an aspect in which FeCo is present in a matrix of $SiO_2$ was confirmed, but an aspect in which FeCo is present in an independent manner as core-shell particles was not confirmed.

Regarding the powder of Comparative Example 1, the same evaluation as in the examples was performed.

Comparative Example 2

A sample was prepared according to examples disclosed in JP5347146B and the same evaluation as that in the examples was performed. The details regarding the manufacturing of the sample of Comparative Example 2 are as follows.

(1) Preparation of Micelle Solution A and Micelle Solution B (1-1) 53 ml of ion exchange water, 165 ml of n-octane, and 34 ml of 1-butanol were mixed with each other. 0.014 mol of iron (III) nitrate nonahydrate was added to this solution and dissolved while fully stirring at room temperature. In addition, the amount of cetyltrimethylammonium bromide as a surfactant was added and stirred so that a molar ratio of ion exchange water/surfactant becomes 29.5, thereby obtaining a micelle solution A.

(1-2) 18.3 ml of ammonia water having a concentration of 25% was added to 34.1 ml of ion exchange water and stirred, and 165 ml of n-ontane and 34 ml of 1-butanol were further added thereto and fully stirred. The amount of cetyltrimethylammonium bromide as a surfactant was added to the solution so that a molar ratio of (ion exchange water+ moisture in ammonia water)/surfactant becomes 30.5, and stirred, thereby obtaining a micelle solution B.

(2) The micelle solution B was added dropwise to the micelle solution A while fully stirring. After finishing dropwise addition, a mixed solution of the micelle solution A and the micelle solution B was continuously stirred for 80 minutes.

(3) While stirring the obtained AB mixed solution, 14.9 ml of tetraethoxysilane (TEOS) was added and stirred for 24 hours. With this step, a layer of $SiO_2$ was formed on a surface of powder of an iron compound.

(4) The obtained solution was subjected to centrifugal separation by a centrifugal separator. The obtained precipitate was collected by this treatment. The collected precipitate was washed with ethanol several times, dried, and collected as powder. A pattern of iron oxyhydroxide was observed from an XRD pattern of this powder, and not a single phase of β, but a dual phase was obtained.

Figure 2:
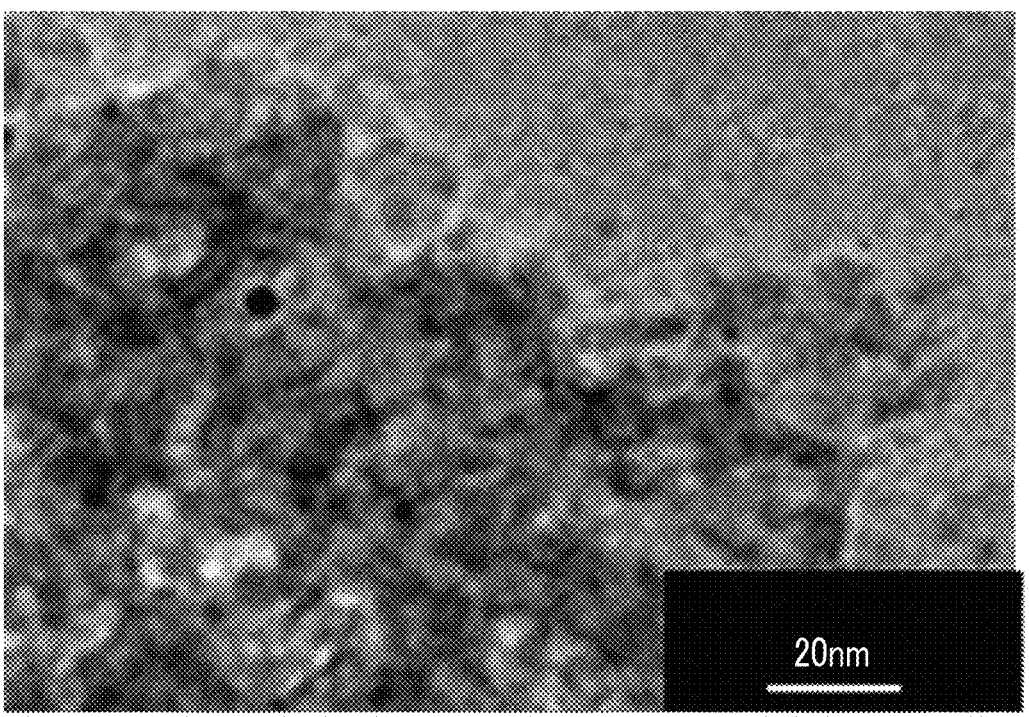
FIG. 2 is an image showing a result obtained by observing powder before calcinating of Comparative Example 2 with the TEM.

FIG. 2 shows a result of the observation of the powder obtained here (powder of Comparative Example 2 before calcinating) with a TEM. In FIG. 2, an aspect in which a plurality of iron oxyhydroxide particles are present in a shell of $SiO_2$, an aspect in which the iron oxyhydroxide particles are aggregated in a matrix-shaped $SiO_2$, and the like were confirmed, but an aspect in which the iron oxyhydroxide particles are present as the core-shell particles in an independent manner was not confirmed.

(5) The powder was calcinated at 1,050° C. in the atmosphere for 4 hours. The calcinated powder was stirred in a NaOH aqueous solution having a concentration of 9 mol/l at 50° C. for 24 hours, $SiO_2$ present on the surface of the powder was removed and filtered, the resultant material was washed with water and dried, thereby obtaining powder including $\varepsilon\text{-}Fe_2O_3$. This powder was left in a hydrogen gas flow at an atmosphere temperature of 400° C. for 40 hours, the surface of the particles of $\varepsilon\text{-}Fe_2O_3$ was reduced, the powder was further left in the atmosphere having an oxygen concentration of 0.4% at 50° C. for 24 hours, for reducing, and then, a protective layer was formed on the surface of $\varepsilon\text{-}Fe_2O_3$. As described above, powder including a core including $\varepsilon\text{-}Fe_2O_3$ and a shell including Fe as a main component (powder of Comparative Example 2) was manufactured.

Regarding the powder of Comparative Example 2, the same evaluation as in the examples was performed.

Manufacturing of Magnetic Recording Medium (Magnetic Tape)

(1) Magnetic Layer Forming Composition List
Magnetic liquid
Ferromagnetic powder (powder prepared in the examples and comparative examples): 100.0 parts
  $SO_3Na$ group-containing polyurethane resin: 14.0 parts
  (Weight-average molecular weight: 70,000, $SO_3Na$ group: 0.4 meq/g)
  Cyclohexanone: 150.0 parts
  Methyl ethyl ketone: 150.0 parts
Abrasive solution
Abrasive solution A
  Alumina abrasive (average particle size: 100 nm): 3.0 parts
  Sulfonic acid group-containing polyurethane resin: 0.3 parts
  (Weight-average molecular weight: 70,000, $SO_3Na$ group: 0.3 meq/g)
  Cyclohexanone: 26.7 parts
Abrasive solution B
  Diamond abrasive (average particle size: 100 nm): 1.0 parts
  Sulfonic acid group-containing polyurethane resin: 0.1 parts
  (Weight-average molecular weight: 70,000, $SO_3Na$ group: 0.3 meq/g)
  Cyclohexanone: 26.7 parts
Silica Sol
  Colloidal silica (average particle size: 100 nm): 0.2 parts
  Methyl ethyl ketone: 1.4 parts
Other components
  Stearic acid: 2.0 parts
  Butyl stearate: 6.0 parts
  Polyisocyanate (CORONATE manufactured by Nippon Polyurethane Industry Co., Ltd.; curing agent): 2.5 parts
Finishing additive solvent
  Cyclohexanone: 200.0 parts
  Methyl ethyl ketone: 200.0 parts (2) Non-Magnetic Layer Forming Composition List
Non-magnetic inorganic powder α-iron oxide: 100.0 parts
Average particle size: 10 nm
Average acicular ratio: 1.9
BET specific surface area: 75 m2/g
Carbon black (average particle size: 20 nm): 25.0 parts
$SO_3Na$ group-containing polyurethane resin (binding agent): 18.0 parts
(Weight-average molecular weight: 70,000, $SO_3Na$ group: 0.2 meq/g)
Stearic acid: 1.0 parts
Cyclohexanone: 300.0 parts
Methyl ethyl ketone: 300.0 parts (3) Back Coating Layer Forming Composition List
Non-magnetic inorganic powder α-iron oxide: 80.0 parts
Average particle size: 0.15 μm
Average acicular ratio: 7
BET specific surface area: 52 m2/g
Carbon black (average particle size: 20 nm): 20.0 parts
A vinyl chloride copolymer: 13.0 parts
Sulfonic acid group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts (4) Manufacturing of Magnetic Tape
The magnetic liquid was prepared by mixing the components in the list of the magnetic liquid and dispersing by using a batch type vertical sand mill for 24 hours.

As dispersion beads, zirconia beads having a particle diameter of 0.5 mmϕ were used. The abrasive solution was prepared by mixing the components in the list of the abrasive solution and dispersing by a batch type ultrasonic device (20 kHz, 300 W) for 24 hours. These dispersion liquids were mixed with other components (silica sol, other components, and the finishing additive solvent), and then, a process was performed by a batch type ultrasonic device (20 kHz, 300 W) for 30 minutes. After that, filtering was performed by using a filter having an average hole diameter of 0.5 μm and a magnetic layer forming composition was prepared (In addition, in a case where the powder of Comparative Example 1 was used, a filter having a filter diameter of 1.2 μm was used).

Regarding the non-magnetic layer forming composition, each component was dispersed by using a batch type vertical sand mill for 24 hours. As dispersion beads, zirconia beads having a particle diameter of 0.1 mmϕ were used. The obtained dispersion liquid was filtered by using a filter having an average hole diameter of 0.5 μm and a non-magnetic layer forming composition was prepared.

Regarding the back coating layer forming composition, the components excluding the lubricant (stearic acid and butyl stearate), polyisocyanate, and 200.0 parts of cyclohexanone were kneaded by an open kneader and diluted, and was subjected to a dispersion process of 12 passes, with a transverse beads mill dispersion device and zirconia beads having a particle diameter of 1 mmϕ, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The obtained dispersion liquid was filtered with a filter having an average hole diameter of 1.0 μm and a back coating layer forming composition was prepared.

After that, the non-magnetic layer forming composition was applied onto a support made of polyethylene naphthalate having a thickness of 5 μm so that a thickness after the drying becomes 100 nm and was dried, and then, the magnetic layer forming composition was applied thereto so that a thickness after the drying becomes 70 nm.

A homeotropic alignment process was performed by applying a magnetic field having a magnetic field strength of 0.6 T in a vertical direction with respect to a coating surface, while the magnetic layer forming composition is wet, and then, the coating surface was dried. After that, the back coating layer forming composition was applied to a side of the support opposite to the coating surface so that a thickness after the drying becomes 0.4 μm and was dried.

Then, a surface smoothing treatment (calendar process) was performed by a calendar configured of only a metal roll, at a speed of 100 m/min, linear pressure of 300 kg/cm (294 kN/m), and a surface temperature of a calendar roll of 100° C., and then, the heat treatment was performed in the environment of the atmosphere temperature of 70° C. for 36 hours. After the heat treatment, the slitting was performed to have a width of ½ inches (0.0127 meters), and a magnetic tape was obtained.

Evaluation Method of Magnetic Tape

1. Evaluation of Electromagnetic Conversion Characteristic (SNR)

A magnetic signal was recorded on each manufactured magnetic tape in a tape longitudinal direction under the following conditions and reproduced with a magnetoresistive (MR) head. A reproduction signal was frequency-analyzed with a spectrum analyzer manufactured by Shibasoku Co., Ltd. and a ratio of the output of 300 kfci and noise accumulated in a range of 0 to 600 kfci was set as the SNR. The evaluation result is shown in Table 1.

Recording and Reproduction Conditions
Recording: recording track width 5 μm
Recording gap 0.17 μm
Head saturated magnetic flux density Bs 1.8 T
Reproduction
Reproduction track width 0.4 μm
Distance between shields (sh-sh distance) 0.08 μm
Recording wavelength: 300 kfci
Evaluation of SNR 5: substantially no noise, a signal is excellent, no error is observed, and there is no practical problems.

4: a degree of noise is small, a signal is excellent, and there is no practical problems.

3: noise is observed, but a signal is excellent, and there is no practical problems.

2: a degree of noise is great, a signal is unclear, and there is a practical problem.

1: noise and signal cannot be distinguished or cannot be recorded, and there is a practical problem.

2. Evaluation of Film Hardness (Running Durability)

Each magnetic tape was caused to run at a linear tester speed of 3 msec, and film hardness of the magnetic layer was evaluated as running durability.

After causing a tape having a length of 100 m to run 1,000 passes, a degree of chipping of the surface of the magnetic layer at positions of 20 m, 40 m, 60 m, and 80 m from the end of the magnetic tape was observed with an optical microscope (EclipseLV150 manufactured by Nikon Corporation). The degree of chipping at the four positions was evaluated in the following criteria and ranked. The evaluation result is shown in Table 1.

Evaluation

5: Sliding mark was not observed.

4: light sliding mark is present, but has not been developed into chipping of the surface of the magnetic layer.

3: surface of the magnetic layer is chipped off, but there is no practical problems 2: surface of the magnetic layer is chipped off, there are a large number of positions where the surface of the magnetic layer is peeled off or the magnetic layer was scraped, which are a practical problem.

1: the entire surface of the magnetic layer is scraped and there is a practical problem.

TABLE 1

| | | Core-shell particles before calcinating | | | | Core-shell particles after calcinating | | | | Magnetic recording medium | |
|---|---|---|---|---|---|---|---|---|---|---|---|
| | Core | Average primary particle diameter of core-shell particles (nm) | Average primary particle diameter of core (nm) | Thickness of shell (nm) | Fe/Si ratio | Average primary particle diameter of core-shell particles (nm) | Average primary particle diameter of core (epsilon type iron oxide-based compound particles) (nm) | Size distribution of core (epsilon type iron oxide-based compound particles) (coefficient of variation) | Thickness of shell (nm) | SNR | Running durability |
| Example 1 | β-iron oxyhydroxide | 18 | 8 | 6 | 1/10 | 20 | 11.1 | 5 | 5 | 5 | 5 |
| Example 2 | Iron oxide having a spinel structure | 18 | 7 | 6 | 1/9 | 20 | 10.2 | 5 | 5 | 5 | 5 |
| Example 3 | β-iron oxyhydroxide | 9 | 8 | 1 | 1/1 | 16 | 14.1 | 4 | 1 | 3 | 3 |
| Example 4 | β-iron oxyhydroxide | 14 | 8 | 3 | 1/2 | 15 | 13.1 | 5 | 2 | 4 | 4 |
| Example 5 | β-iron oxyhydroxide | 21 | 8 | 7 | 1/15 | 21 | 10.9 | 5 | 5 | 4 | 4 |
| Example 6 | β-iron oxyhydroxide | 29 | 8 | 12 | 1/30 | 31 | 11.8 | 5 | 10 | 3 | 3 |
| Example 7 | Iron oxide having a spinel structure | 10 | 7 | 1 | 1/1 | 13 | 12.2 | 4 | 1 | 3 | 3 |
| Example 8 | Iron oxide having a spinel structure | 14 | 7 | 3 | 1/2 | 16 | 11.3 | 5 | 3 | 4 | 4 |
| Example 9 | Iron oxide having a spinel structure | 21 | 7 | 7 | 1/15 | 22 | 10.5 | 5 | 6 | 4 | 4 |

TABLE 1-continued

| | | Core-shell particles before calcinating | | | | Core-shell particles after calcinating | | | Magnetic recording medium | |
|---|---|---|---|---|---|---|---|---|---|---|
| | Core | Average primary particle diameter of core-shell particles (nm) | Average primary particle diameter of core (nm) | Thickness of shell (nm) | Fe/Si ratio | Average primary particle diameter of core-shell particles (nm) | Average primary particle diameter of core (epsilon type iron oxide-based compound particles) (nm) | Size distribution of core (epsilon type iron oxide-based compound particles) (coefficient of variation) | Thickness of shell (nm) | SNR | Running durability |
| Example 10 | Iron oxide having a spinel structure | 30 | 7 | 12 | 1/30 | 32 | 11.4 | 5 | 11 | 3 | 3 |
| Example 11 | β-iron oxyhydroxide | 18 | 8 | 6 | 1/10 | 20 | 11.7 | 5 | 5 | 5 | 5 |
| Example 12 | Iron oxide having a spinel structure | 18 | 7 | 6 | 1/9 | 20 | 10.4 | 5 | 5 | 5 | 5 |
| Example 13 | β-iron oxyhydroxide | 18 | 8 | 6 | 1/10 | 20 | 11.4 | 5 | 5 | 5 | 5 |
| Example 14 | Iron oxide having a spinel structure | 18 | 7 | 6 | 1/9 | 20 | 10.7 | 5 | 5 | 5 | 5 |
| Comparative Example 1 | FeCo | — | 960 | — | 1/10 | — | >1000 | 3 | — | 1 | 1 |
| Comparative Example 2 | β-iron oxyhydroxide | — | 15 | — | 3/1 | — | 23.3 | 2 | — | 1 | 1 |

From the results of Examples 1, 3 to 6, 11, and 13, it was found that, in the core-shell particles of Examples 1 3 to 6, 11, and 13 in which the core before calcinating is β-iron oxyhydroxide, the element mass ratio (Fe/Si ratio) of iron with respect to silicon is 1/1 to 1/30. In addition, it was found that, in the epsilon type iron oxide-based compound particles which are cores of calcinated products obtained by calcinating the core-shell particles thereof, an average primary particle diameter is 11.1 nm to 14.1 nm, excellent size distribution (that is, small coefficient of variation of primary particle diameters) is obtained. Further, it was found that, the magnetic tape using the epsilon type iron oxide-based compound particles exhibits excellent SNR and running durability, and thus, excellent electromagnetic conversion characteristics and film hardness were exhibited.

Further, it was found that, in a case where the Fe/Si ratio of the core-shell particles is 1/2 to 1/15, further excellent size distribution of the generated epsilon type iron oxide-based compound particles (that is, smaller coefficient of variation in primary particle diameters) is obtained, and further excellent SNR and running durability are obtained in a case where a magnetic tape is provided, and thus, excellent electromagnetic conversion characteristics and film hardness were exhibited.

From the results of Examples 2, 7 to 10, 12, and 14, it was found that, in the core-shell particles of Examples 2, 7 to 10, 12, and 14 in which the core before calcinating is iron oxide having a spinel structure, the Fe/Si ratio is 1/1 to 1/30. In addition, it was found that, in the epsilon type iron oxide-based compound particles which are cores of calcinated products obtained by calcinating the core-shell particles thereof, an average primary particle diameter is 10.2 nm to 12.2 nm, excellent size distribution (that is, small coefficient of variation of primary particle diameters) is obtained, and an excellent SNR is obtained in a case where a magnetic tape is provided. Further, it was found that, the magnetic tape using the epsilon type iron oxide-based compound particles exhibits excellent SNR and running durability, and thus, excellent electromagnetic conversion characteristics and film hardness were exhibited.

Further, it was found that, in a case where the Fe/Si ratio of the core-shell particles is 1/2 to 1/15, further excellent size distribution of the generated epsilon type iron oxide-based compound particles (that is, smaller coefficient of variation in primary particle diameters) is obtained, and further excellent SNR and running durability are obtained in a case where a magnetic tape is provided, and thus, excellent electromagnetic conversion characteristics and film hardness were exhibited.

On the other hand, it was found that, in FeCo particles including the epsilon type iron oxide-based compound obtained by Comparative Example 1 in which the core-shell particles of this disclosure is not formed, an average primary particle diameter is great, and thus, an SNR, in a case where a magnetic tape is provided, is poor.

It was found that, in the epsilon type iron oxide-based compound particles obtained by Comparative Example 2 in which the core-shell particles of this disclosure is not formed, an average primary particle diameter is 23.3 nm, poor size distribution (that is, great coefficient of variation of primary particle diameters) is obtained, and an SNR, in a case where a magnetic tape is provided, is poor.

INDUSTRIAL APPLICABILITY

The core-shell particles of this disclosure can provide epsilon type iron oxide-based compound particles having a small coefficient of variation of primary particle diameter and showing excellent SNR and running durability, in a case where a magnetic recording medium is used, and thus, the core-shell particles can be preferably used for manufacturing of a magnetic recording medium having excellent magnetic properties. In addition, the core-shell particles of this disclosure can be preferably used for a radio wave absorber, a drug delivery system, and the like.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferable embodiments of the invention. It is intended that the scope of the invention be defined by the following claims and their equivalents.

What is claimed is:

1. A core-shell particle comprising:
   a core including at least one iron oxide selected from the group consisting of $Fe_2O_3$ and $Fe_3O_4$, or iron oxyhydroxide; and
   a shell that coats the core, the shell including a polycondensate of a metal alkoxide and including a metal element other than iron, wherein the metal element other than iron is different from a metal element included in the metal alkoxide; the metal element is at least one metal element selected from the group consisting of Ga, Al, In, Nb, Co, Zn, Ni, Mn, Ti and Sn; and the metal element is present in an un-ionized element form or in an ionized form in a salt.

2. The core-shell particle according to claim 1, wherein one core-shell particle comprises one core.

3. The core-shell particle according to claim 1, wherein the at least one iron oxide selected from the group consisting of $Fe_2O_3$ and $Fe_3O_4$ comprises a spinel type structure.

4. The core-shell particle according to claim 1, wherein the iron oxyhydroxide comprises β-iron oxyhydroxide.

5. The core-shell particle according to claim 1, wherein the metal alkoxide comprises silicon.

6. The core-shell particle according to claim 5, wherein an element mass ratio of iron with respect to silicon is from 1/2 to 1/15.

7. A method of manufacturing a core-shell particle, the method comprising:
   (A) mixing (i) an organic solvent including a surfactant and an alkali aqueous solution and (ii) a core component including at least one iron oxide selected from the group consisting of $Fe_2O_3$ and $Fe_3O_4$, or iron oxyhydroxide, to form a reverse micelle in which the core is incorporated into the surfactant in the organic solvent; and
   (B) stirring and mixing the core formed by the emulsifyingmixing of (A), a metal alkoxide, and a metal element other than iron in the organic solvent, to allow the metal alkoxide to undergo condensation polymerization in the reverse micelle including the core to form a polycondensate of the metal alkoxide, thereby coating the core with a shell including the polycondensate of the metal alkoxide and the metal element other than iron,
   wherein the metal element other than iron is different from a metal element included in the metal alkoxide; the metal element is at least one metal element selected from the group consisting of Ga, Al, In, Nb, Co, Zn, Ni, Mn, Ti and Sn; and the metal element is present in an un-ionized element form or in an ionized form in a salt.

8. The method of manufacturing a core-shell particle according to claim 7, wherein the surfactant comprises a nonionic surfactant.

9. The method of manufacturing a core-shell particle according to claim 7, wherein one core-shell particle is formed with respect to one core.

10. The method of manufacturing a core-shell particle according to claim 7, wherein the at least one iron oxide selected from the group consisting of $Fe_2O_3$ and $Fe_3O_4$ comprises a spinel type structure.

11. The method of manufacturing a core-shell particle according to claim 7, wherein the iron oxyhydroxide comprises β-iron oxyhydroxide.

12. The method of manufacturing a core-shell particle according to claim 7, wherein the metal alkoxide comprises silicon.

13. The method of manufacturing a core-shell particle according to claim 12, wherein an element mass ratio of iron with respect to silicon in the core-shell particle is from 1/2 to 1/15.

14. A method of manufacturing an epsilon type iron oxide-based compound particle, the method comprising:
   forming the core-shell particle of claim 1;
   calcinating the core-shell particle; and
   removing a shell from the core-shell particle.

15. A method of manufacturing an epsilon type iron oxide-based compound particle, the method comprising:
   forming a core-shell particle according to the method of manufacturing a core-shell particle of claim 7;
   calcinating the core-shell particle; and
   removing a shell from the core-shell particle.

16. A method of manufacturing a magnetic recording medium, the method comprising:
   forming an epsilon type iron oxide-based compound particle according to the method of claim 14;
   preparing a composition for forming a magnetic layer, the composition comprising the epsilon type iron oxide-based compound particle;
   applying the composition for forming a magnetic layer onto a non-magnetic support; and
   drying the composition for forming a magnetic layer on the non-magnetic support to form a magnetic layer.

17. A method of manufacturing a magnetic recording medium, the method comprising:
   forming an epsilon type iron oxide-based compound particle according to the method of claim 15;
   preparing a composition for forming a magnetic layer, the composition comprising the epsilon type iron oxide-based compound particle;
   applying the composition for forming a magnetic layer onto a non-magnetic support; and
   drying the composition for forming a magnetic layer on the non-magnetic support to form a magnetic layer.

* * * * *